United States Patent
Erdman et al.

(10) Patent No.: US 12,455,416 B2
(45) Date of Patent: Oct. 28, 2025

(54) LOW PROFILE FIBER HOLDERS FOR USE WITH BARE FIBER MULTI-FIBER FIBER OPTIC CONNECTORS

(71) Applicant: CommScope Technologies LLC, Hickory, NC (US)

(72) Inventors: David Donald Erdman, Hummelstown, PA (US); Michael Aaron Kadar-Kallen, Harrisburg, PA (US); Josiah D. Kadar-Kallen, Harrisburg, PA (US); Jaime Gonzalez Batista, Prior Lake, MN (US); Randall Bobby Paul, Elizabethville, PA (US)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 228 days.

(21) Appl. No.: 18/043,411

(22) PCT Filed: Aug. 24, 2021

(86) PCT No.: PCT/US2021/047370
§ 371 (c)(1),
(2) Date: Feb. 28, 2023

(87) PCT Pub. No.: WO2022/046784
PCT Pub. Date: Mar. 3, 2022

(65) Prior Publication Data
US 2023/0393345 A1 Dec. 7, 2023

Related U.S. Application Data

(60) Provisional application No. 63/104,646, filed on Oct. 23, 2020, provisional application No. 63/071,779, filed on Aug. 28, 2020.

(51) Int. Cl.
*G02B 6/36* (2006.01)
*G02B 6/38* (2006.01)

(52) U.S. Cl.
CPC .......... *G02B 6/3636* (2013.01); *G02B 6/3652* (2013.01); *G02B 6/3885* (2013.01)

(58) Field of Classification Search
None
See application file for complete search history.

(56) References Cited

U.S. PATENT DOCUMENTS 5,257,334 A * 10/1993 Takahashi ............ G02B 6/3822
385/83
5,778,123 A * 7/1998 Hagan .................... G02B 6/424
385/76

(Continued)

FOREIGN PATENT DOCUMENTS

CA    2 361 130 A1    5/2002
KR    1019990035461 A    5/1999

(Continued)

OTHER PUBLICATIONS

Extended European Search Report for Application No. 21862581.2 mailed Aug. 5, 2024.

(Continued)

*Primary Examiner* — Jerry Rahll
(74) *Attorney, Agent, or Firm* — MERCHANT & GOULD P.C.

(57) ABSTRACT

The present disclosure relates generally to a fiber holder for holding optical fibers. The fiber holder can include a main holder body having a length that extends between first and second ends of the main holder body, a width that extends between first and second side walls of the main holder body, and a height that extends between top and bottom sides of the main holder body. The main holder body can define a plurality of fiber positioning grooves that extend along the length of the main holder body and spaced across the width of the main holder body. The main holder body also includes a fiber engagement structure having a fiber engagement (Continued)

surface. The fiber engagement structure can be aligned with an open region that interrupts the plurality of fiber positioning grooves. The fiber engagement structure can extend through the height of the main holder body from the top side to the fiber engagement surface.

18 Claims, 27 Drawing Sheets

(56) References Cited

U.S. PATENT DOCUMENTS

| | | | | |
|---|---|---|---|---|
| 5,920,670 A * | 7/1999 | Lee | ................... | G02B 6/3893 385/60 |
| 6,027,253 A * | 2/2000 | Ota | ................... | G02B 6/3839 385/59 |
| 6,424,785 B1 * | 7/2002 | Melchior | ............. | G02B 6/3839 385/139 |
| 6,459,843 B1 * | 10/2002 | Igl | .................. | G02B 6/3893 385/136 |
| 8,529,138 B2 * | 9/2013 | Duis | ................. | G02B 6/3861 385/59 |
| 9,575,272 B2 | 2/2017 | Ott | | |
| 9,810,850 B1 | 11/2017 | Angelov et al. | | |
| 2012/0014648 A1 * | 1/2012 | Duis | ................. | G02B 6/3839 385/52 |
| 2012/0257860 A1 * | 10/2012 | Li | ................... | G02B 6/3885 385/83 |
| 2014/0072265 A1 | 3/2014 | Ott | | |
| 2015/0338581 A1 | 11/2015 | Hikosaka | | |

FOREIGN PATENT DOCUMENTS

| | | |
|---|---|---|
| KR | 101825145 B1 | 2/2018 |
| WO | 2016043922 A1 | 3/2016 |
| WO | 2016100384 A1 | 6/2016 |
| WO | 2017081306 A1 | 5/2017 |
| WO | 2019/079326 A1 | 4/2019 |
| WO | 2020046709 A1 | 3/2020 |
| WO | 2020079326 A1 | 4/2020 |
| WO | 2020112645 A1 | 6/2020 |
| WO | 2021163063 A1 | 8/2021 |

OTHER PUBLICATIONS

International Search Report from PCT/0S2021/047370 mailed Dec. 13, 2021.

* cited by examiner

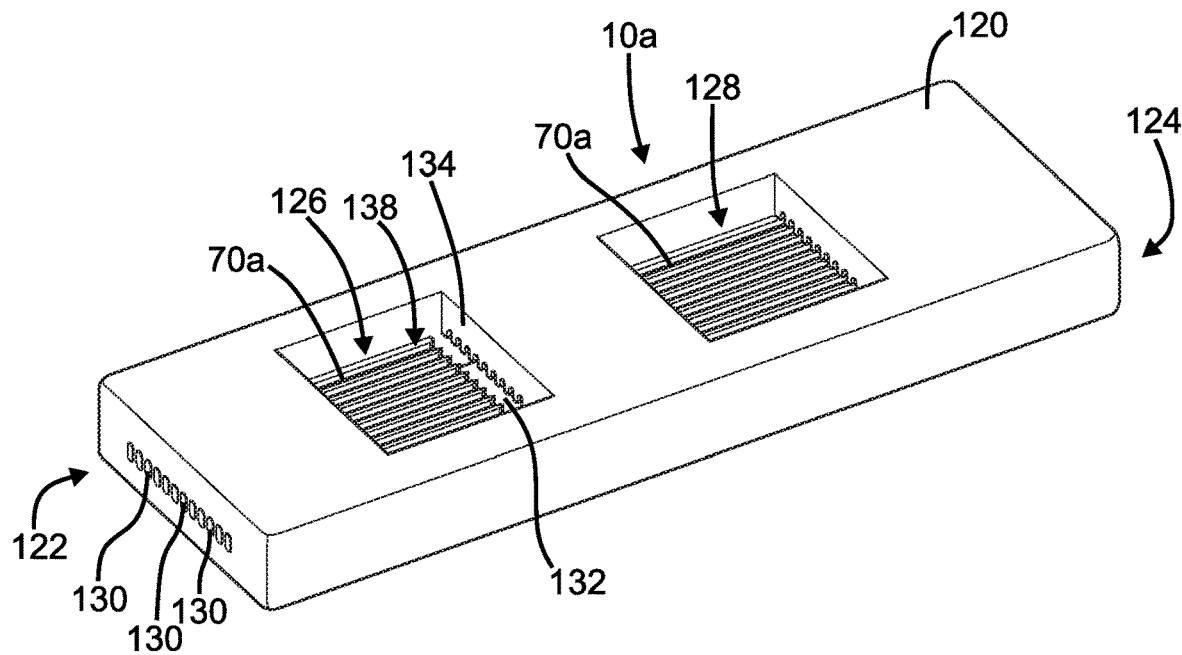

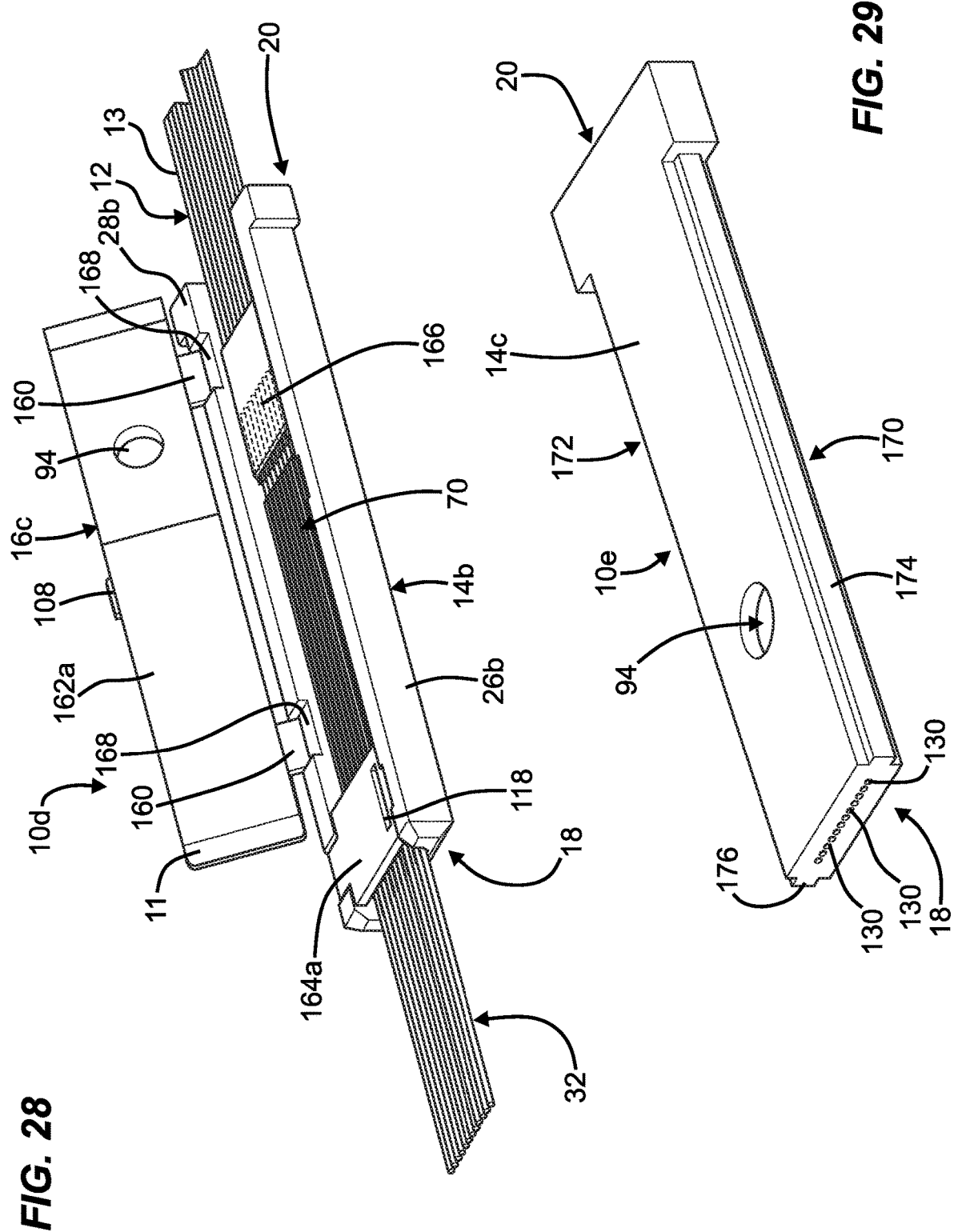

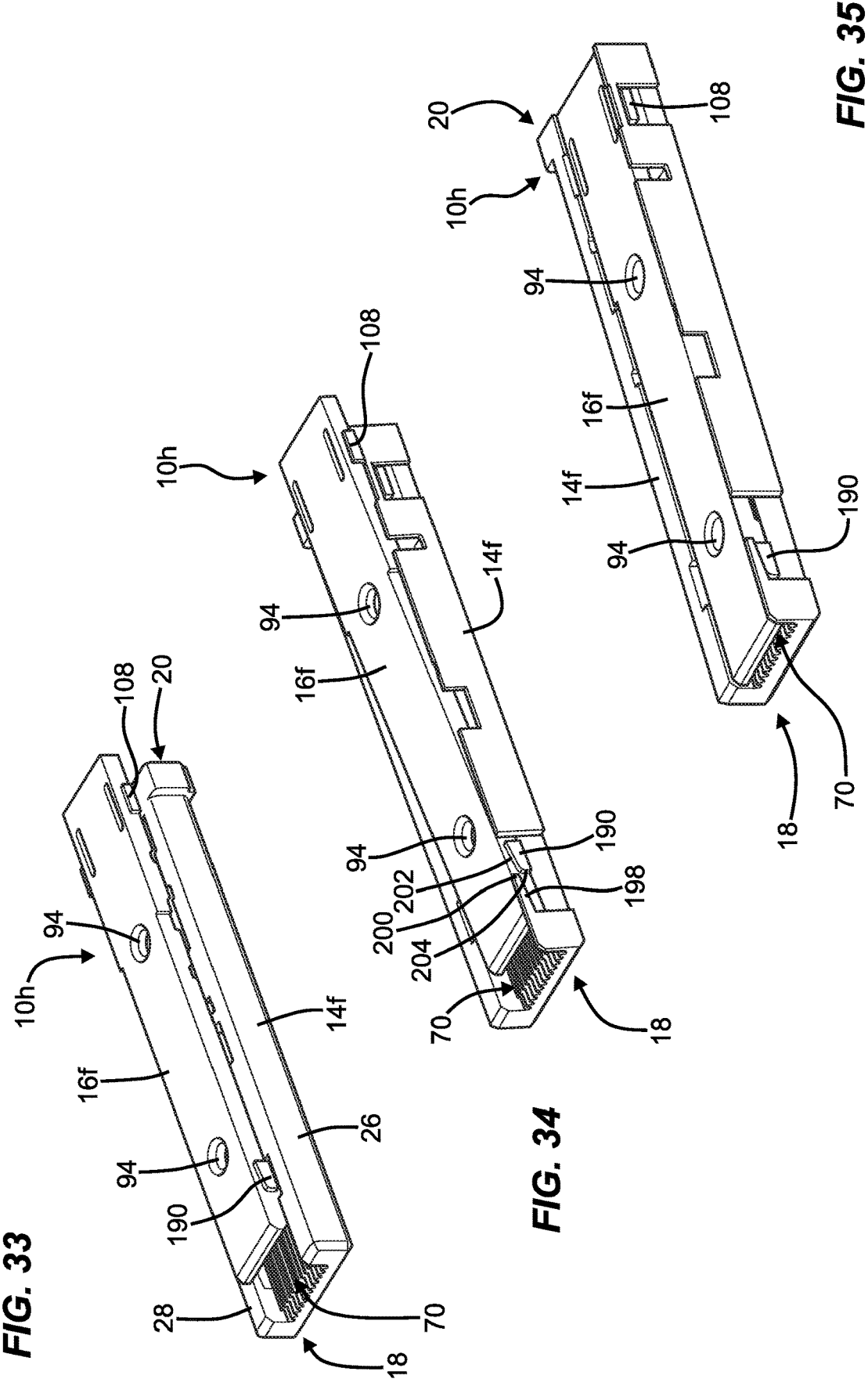

LOW PROFILE FIBER HOLDERS FOR USE WITH BARE FIBER MULTI-FIBER FIBER OPTIC CONNECTORS

CROSS-REFERENCE TO RELATED APPLICATIONS

This application is being filed, as a National Stage Application of PCT International Patent Application PCT/US2021/047370 filed Aug. 24, 2021 and claims priority to U.S. Provisional Patent Application Nos. 63/071,779, filed Aug. 28, 2020; and 63/104,646, filed Oct. 23, 2020; the disclosures of which are incorporated herein by reference in their entireties.

TECHNICAL FIELD

The present disclosure relates generally to multi-fiber connectivity. More particularly, the present disclosure relates to optical fiber holders for use with bare fiber multi-fiber fiber optic connectors.

BACKGROUND

Fiber optic connectors are commonly used in optical fiber communication systems to effect demateable optical connections between waveguides such as optical fibers. A typical optical connection is made by co-axially aligning two optical fibers in end-to-end relation with end faces of the optical fibers opposing one another. To effect optical coupling and minimize Fresnel loss, it is typically preferred for "physical contact" to exist between the optical waveguides, which, in the case of optical connectors, is generally between the opposed end faces of the aligned optical fibers.

Traditionally optical connectors have employed "ferrules." Ferrules are well-known components, which each hold one or more optical fibers such that the end faces of the optical fibers are presented for optical coupling. For example, traditional single fiber optical connectors such as SC or LC connectors include cylindrical ferrules with optical fibers supported and precisely centered within the ferrules. A traditional multi-fiber optical connector such as an MPO connector can include a ferrule that supports a plurality of optical fibers in a row. In the case of MPO connectors, the ferrules of two fiber optic connectors desired to be coupled together have a mating male and female configuration (e.g., a pin and socket configuration) which aligns the ferrules and concurrently aligns the plurality of optical fibers supported by the ferrules.

Another type of fiber optic connector can be referred to as a ferrule-less fiber optic connector or a bare fiber optic connector. In a bare fiber optic connector, an end portion of an optical fiber corresponding to the bare fiber optic connector is not supported by a ferrule. Instead, the end portion of the optical fiber is a free end portion. Similar to the ferruled connectors described above, fiber optic adapters can be used to assist in optically coupling together two bare fiber optic connectors. Fiber optical adapters for bare fiber optic connectors can include internal fiber alignment devices configured to receive optical fibers of bare fiber optic connectors desired to be optically coupled together and to align the fiber tips of the fiber optic connectors to enable the transfer of optical signals there between.

Fiber optical adapters are used to optically couple together optical fiber tips of optical connectors. Fiber optical adapters can include specialized fiber alignment devices to receive bare optical fibers and align the fiber tips to enable the transfer of optical signals therebetween. Optical connectors can be secured to the optical adapters when received at the ports of the optical adapters.

It is desirable to have adequate solutions for holding optical fibers for use with bare fiber multi-fiber fiber optic connectors.

SUMMARY

The present disclosure relates generally to a low-profile fiber holder. The low-profile fiber holder has a compact configuration to hold optical fibers in linear arrays for fiber preparation that may include cleaving and/or stripping. The fiber holder can be designed for moldability and have a small, compact size. In one example, the fiber holder is adapted for holding and positioning optical fibers within a fiber optic connector.

As used herein, the term "optical fiber" relates to an optical transmission element. In certain examples, the optical fiber can have a core size between 8-12 micrometers in outer diameter, a cladding layer with an outer diameter of 120-130 micrometers, and a coating layer with an outer diameter of 250 micrometers. The optical fibers can include ribbonized portions and bare fiber portions (i.e., no coating layer). The low-profile fiber holder provides a desired pitch for optical fibers routed therethrough in preparation for bare fiber connectivity. In certain examples, the pitch is 200 micrometers. In other examples, the pitch is 250 micrometers.

The low-profile fiber holder can be a single unitary piece made by a molding processing that includes an undercut to create a bridge for retaining and positioning the holder. In one example, the molding process does not require the use of core pins during molding. In certain examples, the fiber holder is molded with grooves in combination with a bridge. The bridge and grooves can cooperate to provide fiber positioning and alignment.

The low-profile fiber holder also can include an anchoring region for securing the optical fibers to the low-profile fiber holder with adhesive (e.g., epoxy).

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIGS. 14-16 illustrate a second embodiment of a fiber holder having a one-piece construction in accordance with the principles of the present disclosure.

FIGS. 27-28 illustrate a fifth embodiment of a fiber holder with a pivotal cover in accordance with the principles of the present disclosure.

FIG. 29 illustrates a sixth embodiment of a fiber holder that has a one-piece configuration in accordance with the principles of the present disclosure.

FIGS. 33-35 illustrate a sequence of mounting the cover of FIG. 32 to the main holder body.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

As used herein, a bare fiber is a section of optical fiber that does not include any coating. Instead, the bare fiber includes a core surrounded by a cladding layer. The optical fiber is "bare" because the cladding layer is exposed and not covered by a supplemental coating layer such as acrylate.

Figure 1:
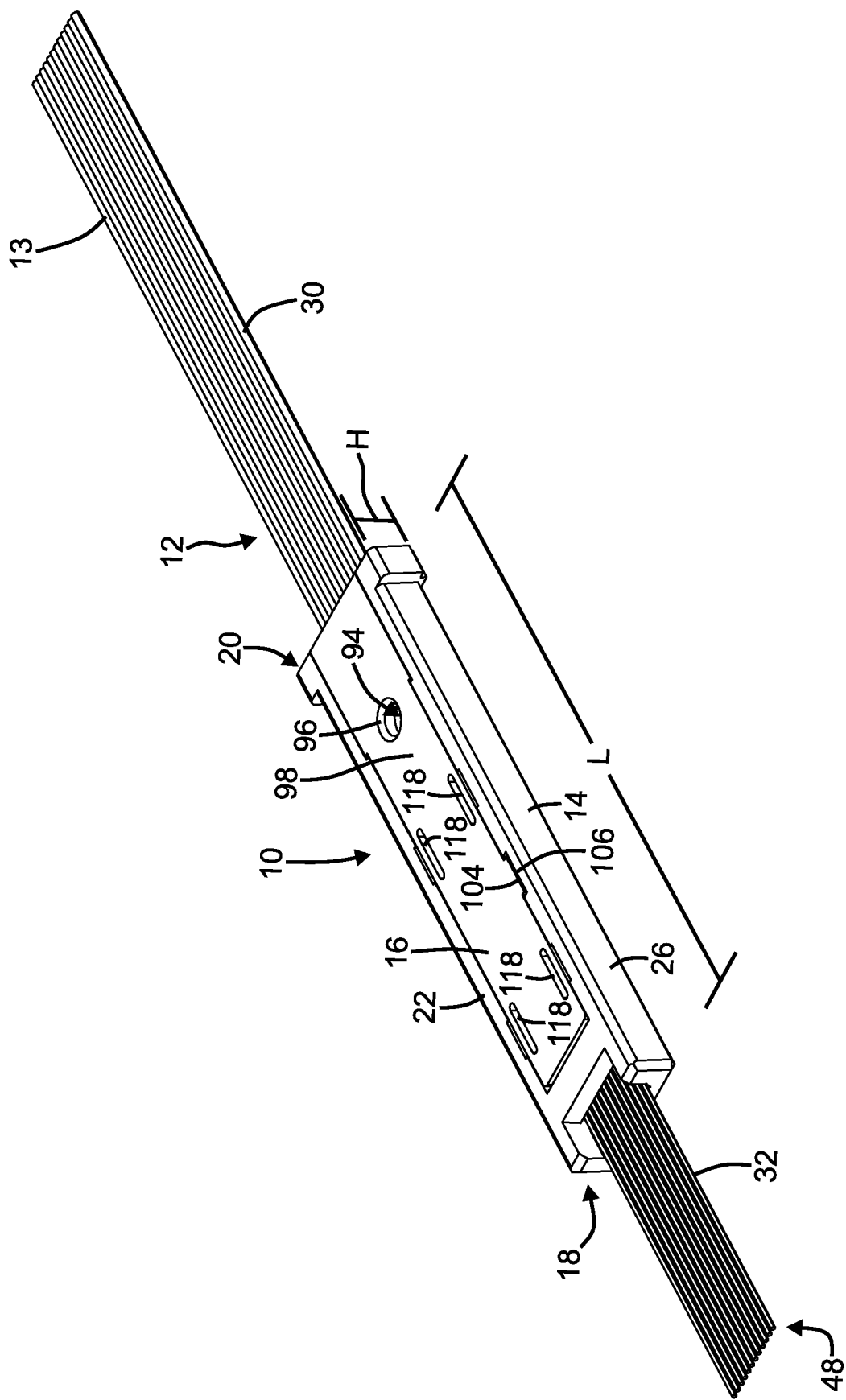
FIG. 1 illustrates a first embodiment of a fiber holder that includes a main holder body with optical fibers and a cover in accordance with the principles of the present disclosure.

FIG. 1 depicts a fiber holder 10 in accordance with the principles of the present disclosure shown with a plurality of optical fibers 12 routed therethrough. The fiber holder 10 has a low-profile, compact configuration that includes a main holder body 14 (e.g., one-piece body) and a cover 16. The fiber holder 10 is configured to provide a reliable and consistent optical connection between optical fibers when used with bare multi-fiber fiber optic connectors and/or adapters.

Figure 7:
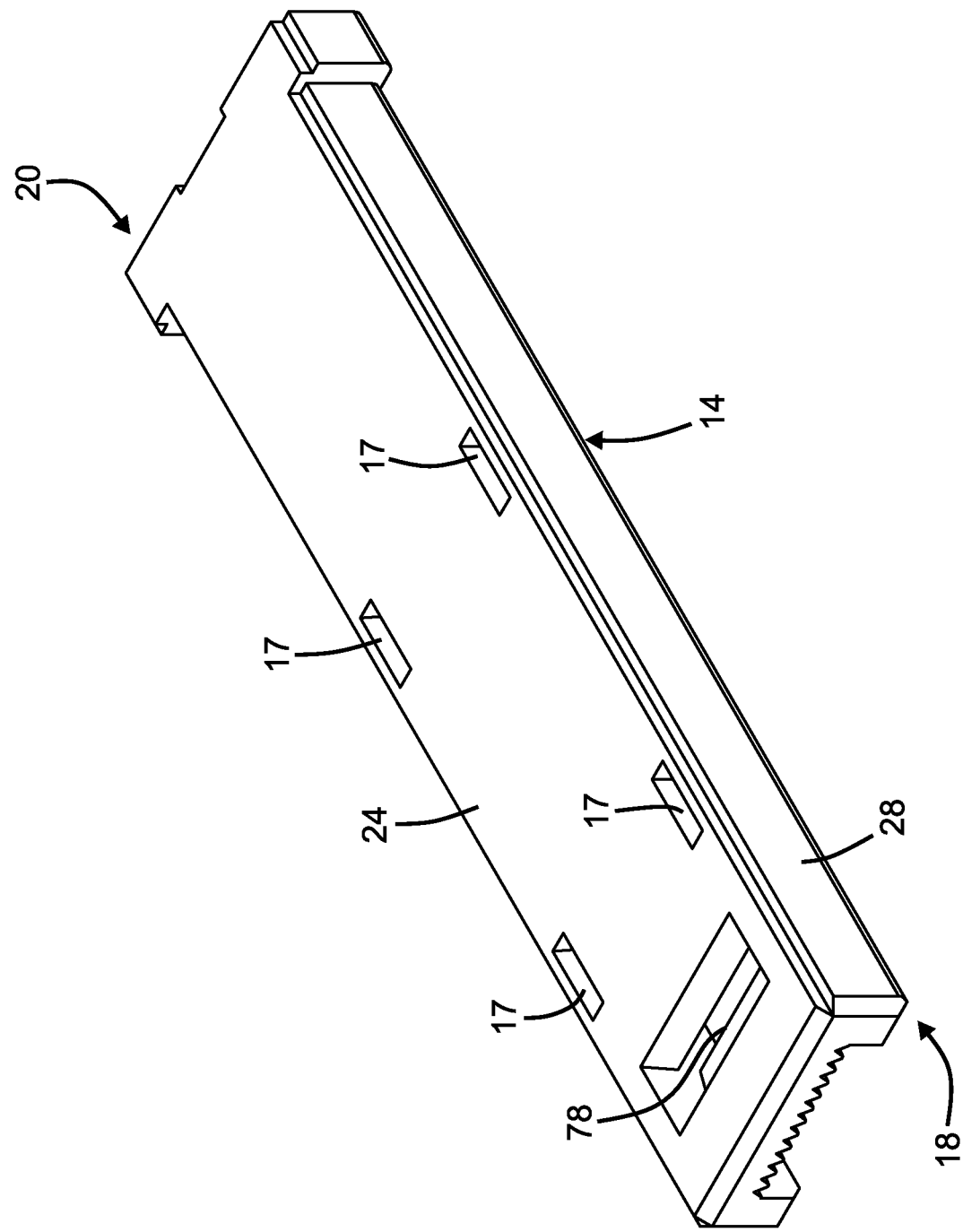
FIG. 7 illustrates a bottom perspective view of the main holder body of FIG. 6 showing an open region resulting from undercut molding of a bridge portion and open slots resulting from undercut molding of snap-fit latch catches.

The main holder body 14 of the fiber holder 10 includes a first end 18, an opposite, second end 20, a top side 22, an opposite, bottom side 24 (see FIG. 7), a first side wall 26, and an opposite, second side wall 28 (see FIG. 7). The main holder body 14 has a length L that extends between the first and second ends 18, 20, a height H (see FIG. that extends between the top and bottom sides 22, 24 and a width W (see FIG. 5) that extends between the first and second side walls 26, 28.

The plurality of optical fibers 12 are shown routed through the fiber holder between the main holder body 14 and the cover 16. The optical fibers 12 include a coating layer 30 that make coated portions 13 of the optical fibers 12 and can optionally include ribbonized portions. The optical fibers 12 can also include bare fiber portions 32. The coated optical fibers can enter the fiber holder 10 at the second end 20 and the bare fiber portions 32 can project from the opposite, first end 18 of the fiber holder 10. The fiber holder 10 has a low-profile, compact configuration such that the bare fiber portions 32 of the optical fibers can be precisely positioned for receipt within another structure, such as, a bare fiber optical connector or a bare fiber optical adapter.

Figure 2:
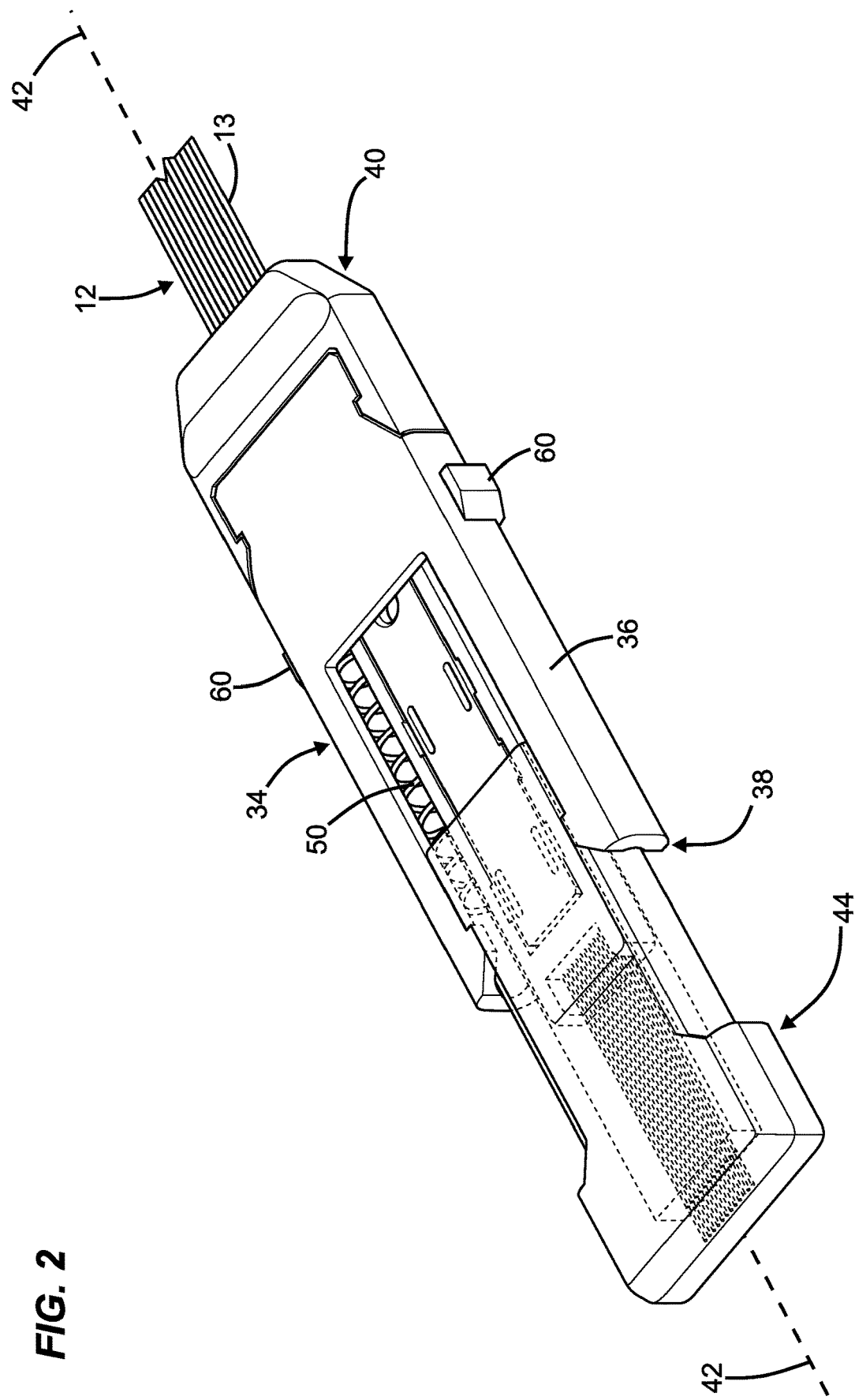
FIGS. 2-3 illustrate the fiber holder of FIG. 1 installed in a bare fiber optical connector having a spring-loaded retractable shroud.
Figure 3:
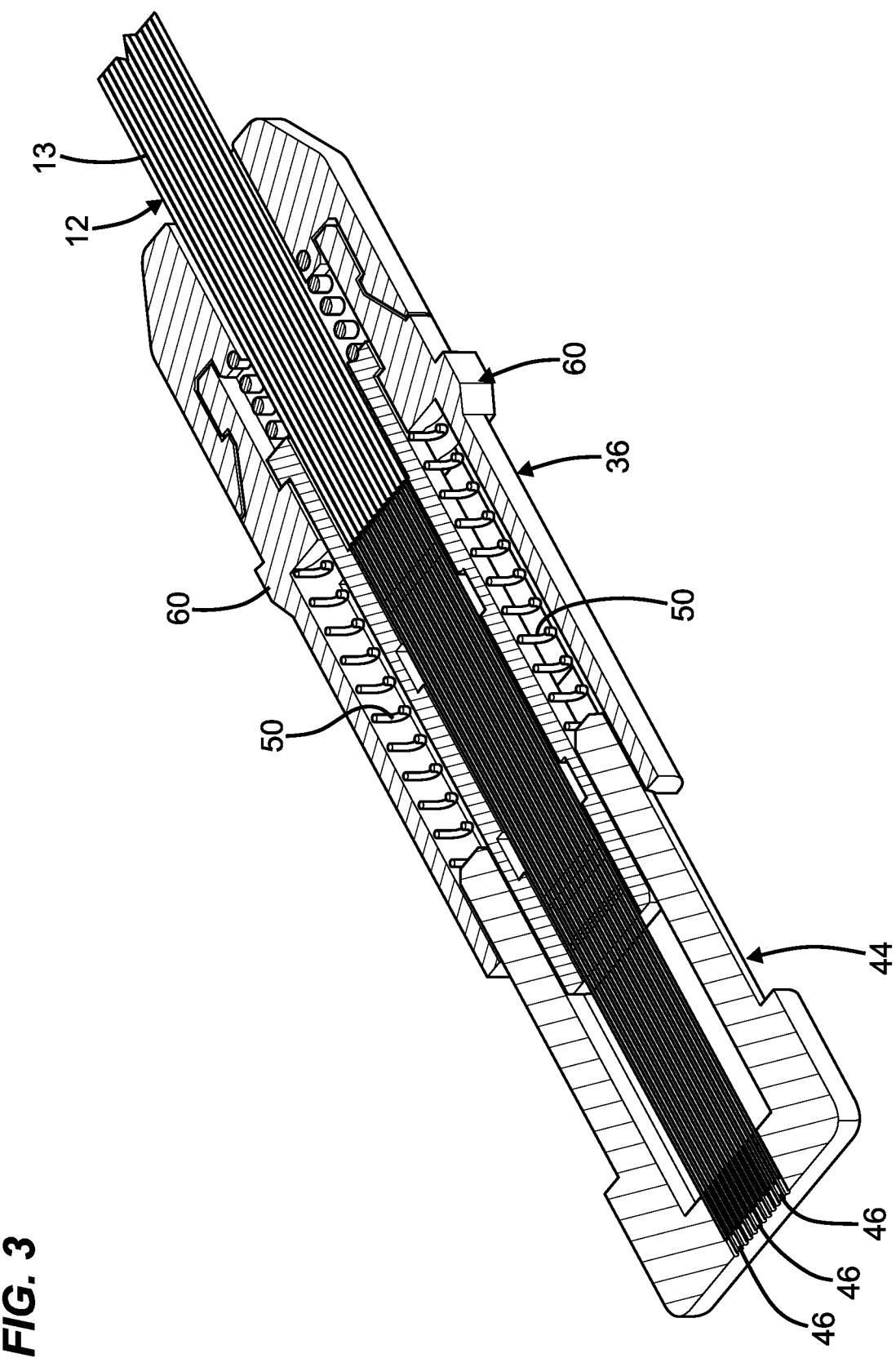

Turning to FIGS. 2-3, an example bare fiber optical connector 34 is depicted showing the fiber holder 10 installed therein. It will be appreciated that multiple bare fiber optical connectors 34 can be stacked together. The bare fiber optical connector 34 includes a connector body 36 having a front end 38 and an opposite rear end 40. The connector body 36 defines a longitudinal axis 42 that extends through the connector body 36 in an orientation that extends from the front end 38 to the rear end 40 of the connector body 36.

The bare fiber optical connector 34 includes a shroud 44 mounted at the front end 38 of the connector body 36. The shroud 44 defines fiber passages 46 through which the optical fibers 12 extend. The shroud 44 is movable along the longitudinal axis 42 between an extended position (see FIG. 2) where a front end portion 48 of the optical fibers 12 is protected within the fiber passages 46 and a retracted position (see FIG. 4) where the front end portion 48 of the optical fibers 12 project forwardly beyond the shroud 44. The bare fiber optical connector 34 includes springs 50 for biasing the shroud 36 toward the extended position. In certain examples, the shroud 44 retracts back into the connector body 36 as the shroud 44 moves from the extended position toward the retracted position. In certain examples, relative movement is permitted between the shroud 44 and the optical fibers 12 so that the shroud 44 can slide relative to the optical fibers 12.

In certain examples, the front end portions 48 of the optical fibers 12 may extend beyond the shroud 44 when the shroud 44 is in the retracted position. In preferred examples, the front end portions 48 of the optical fibers 12 that project forwardly beyond the shroud 44 when the shroud 44 is retracted are bare fiber portions (e.g., fiber portions with only a core and cladding). In certain examples, the bare fiber portions project at least 3, 4, 5 or 6 millimeters beyond the shroud 44 when the shroud 44 is fully retracted, although alternatives are possible.

Figure 4:
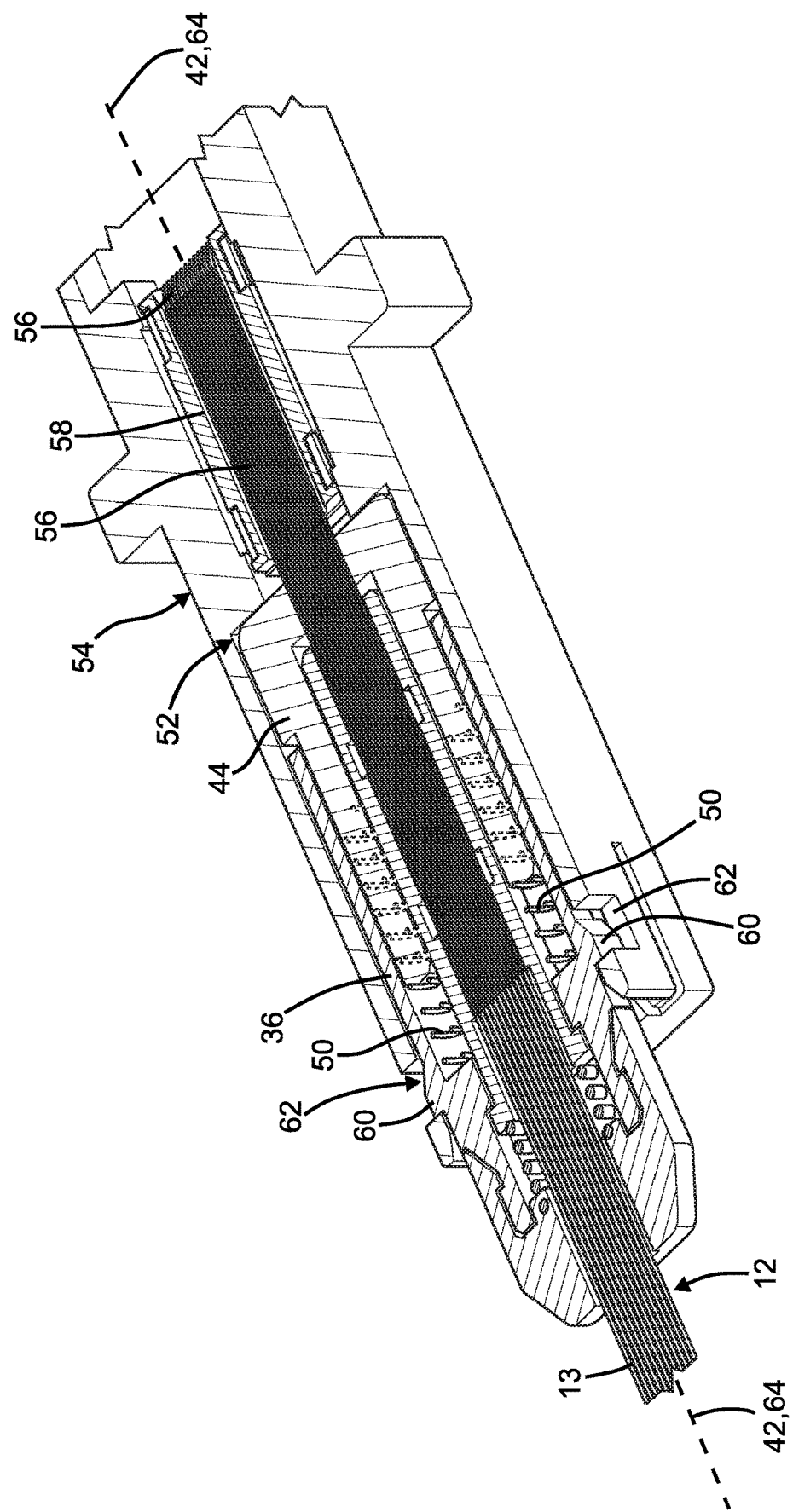
FIG. 4 illustrates the bare fiber optical connector inserted into a bare-fiber adapter with the shroud retracted and bare fiber portions inserted within an alignment device of the bare-fiber adapter.

As depicted in FIG. 4, the bare fiber optical connector 34 can be inserted into a first adapter port 52 of a multi-fiber fiber optic adapter 54. It will be appreciated that the multi-fiber fiber optic adapter 54 is adapted to receive optical fibers that are not supported by or secured within a ferrule. The fiber passages 46 of the shroud 44 can be arranged and configured to align with alignment passages 56 of an alignment device 58 upon insertion of the bare fiber optical connector 34 into the first adapter port 52 of the multi-fiber fiber optic adapter 54. The bare fiber optical connector 34 includes latches 60 to retain the bare fiber optical connector 34 inserted into the first adapter port 52 of the multi-fiber fiber optic adapter 54. The multi-fiber fiber optic adapter 54 defines notched sections 62 at opposite sides thereof for receiving the latches 60 of the bare fiber optical connector 34. The bare fiber optical connector 34 slides into the first adapter port 52 until the latches 60 snap into the notched sections 62 and the shroud 44 is in the retracted position. The alignment passages 56 can extend along a fiber insertion axis 64 to receive the bare fiber portions 32 of the optical fibers 12 when the bare fiber optical connector 34 is inserted into the first adapter port 52. The alignment passages 56 can be v-grooves (e.g., half circles, spheres, etc.).

Figure 5:
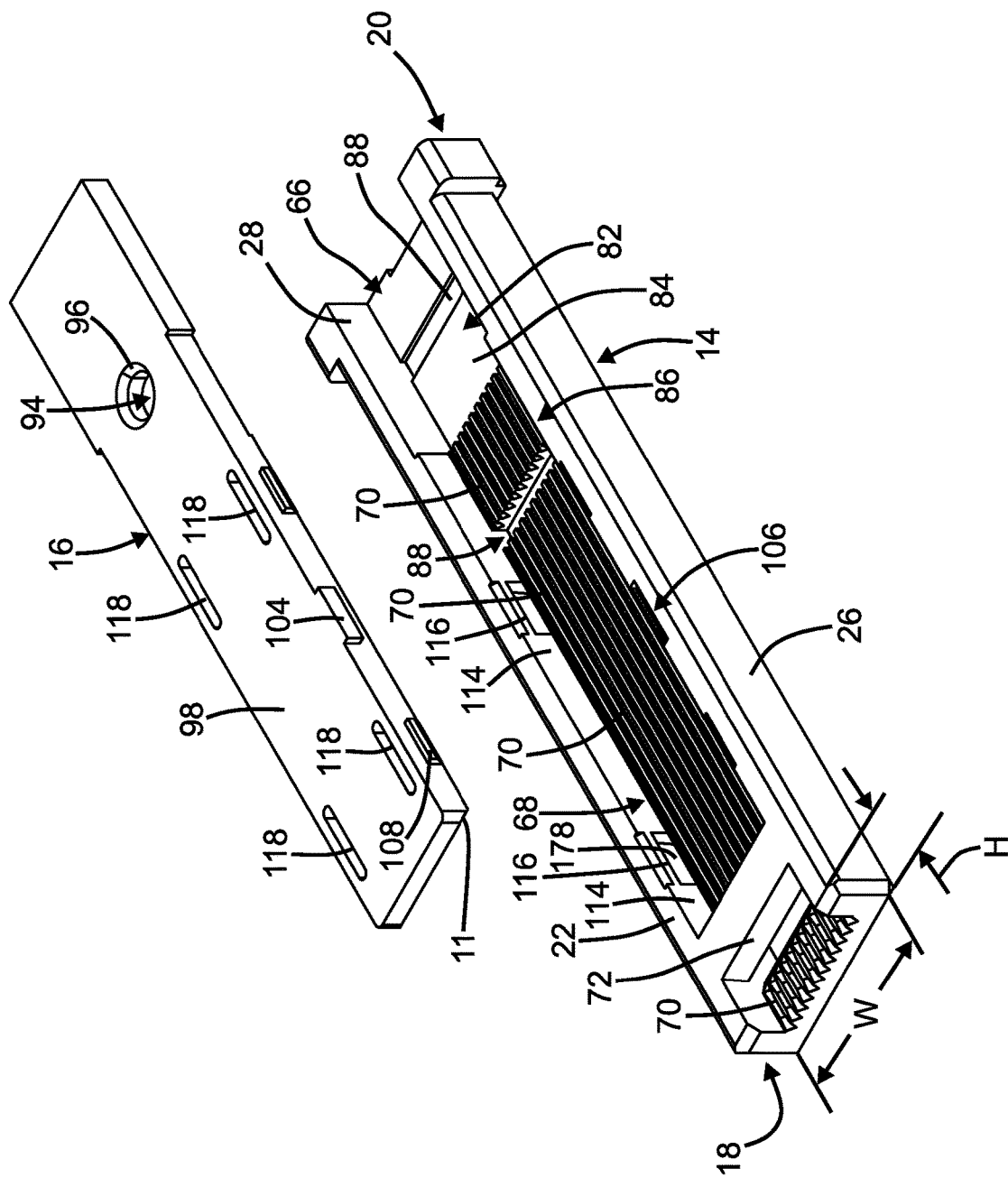
FIG. 5 illustrates the fiber holder of FIG. 1 with the optical fibers omitted and the cover exploded from the main holder body.
Figure 6:
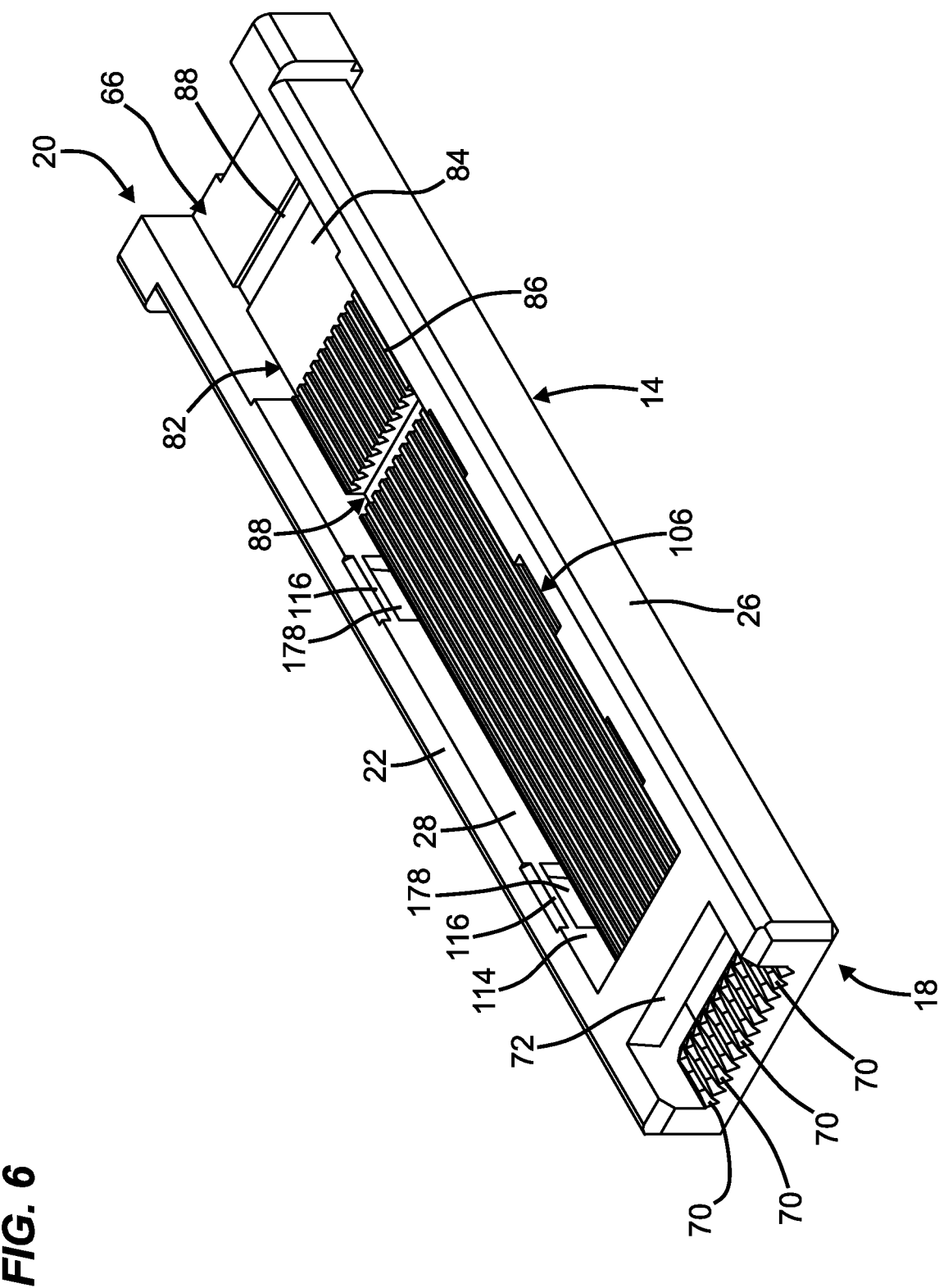
FIG. 6 illustrates a top perspective view of the main holder body of the fiber holder of FIG. 1.
Figure 8:
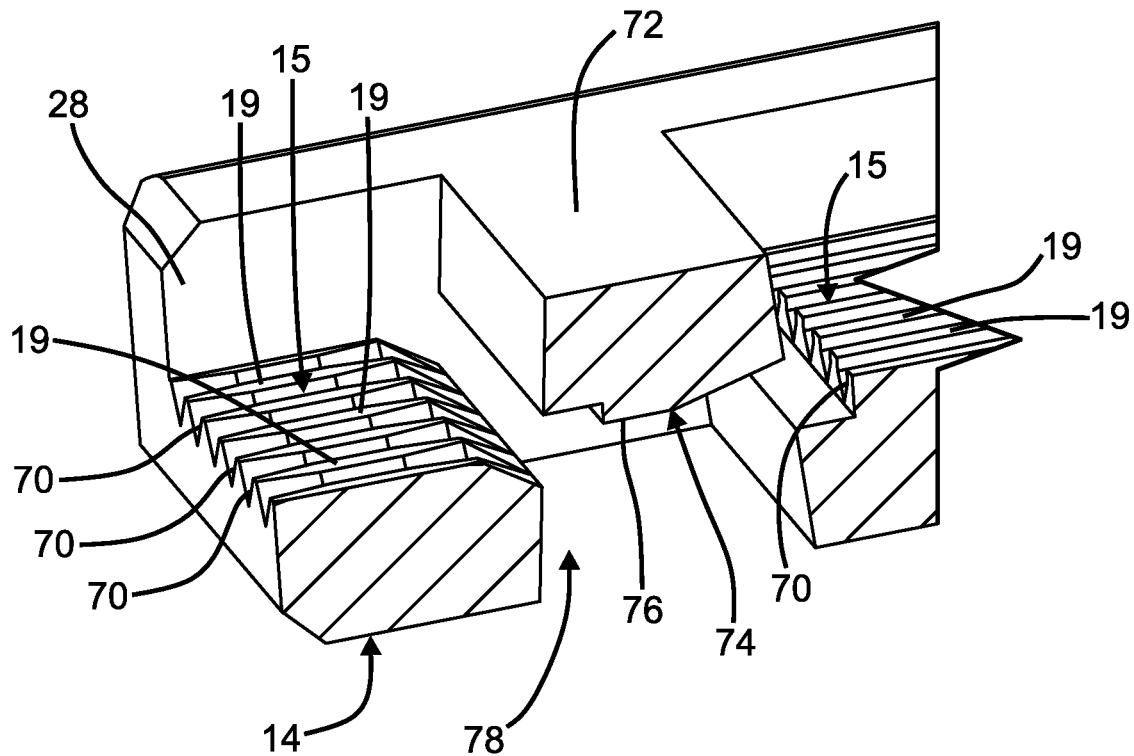
FIG. 8 illustrates a cross-sectional partial view of FIG. 6 showing the open region interrupting fiber alignment grooves in the main holder body.
Figure 9:
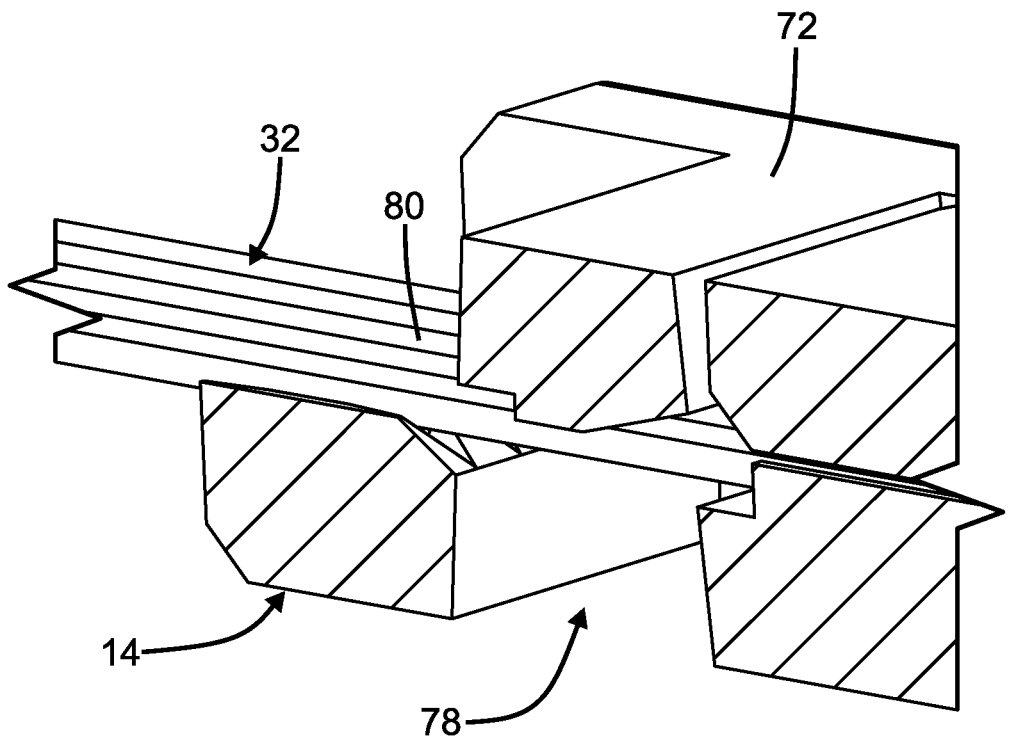
FIG. 9 illustrates optical fibers routed through the open region that interrupts the fiber alignment grooves in the main holder body.

Turning to FIGS. 5-6, the main holder body 14 defines a main channel 66 that extends between the first and second ends 18, 20. The main channel 66 can be open at the top side 22 of the main holder body 14 for at least a majority of the length L of the main holder body 14. The main channel 66 can be defined between the first and second side walls 26, 28 and can include a bed 68 that extends between the first and second side walls 26, 28 and defines a plurality of fiber positioning grooves 70 (e.g., fiber receiving grooves) that have open sides 15 (see FIG. 8) that face upwardly in a first direction. The fiber positioning grooves 70 may include V-grooves, U-shaped grooves or half rounds or other shapes of grooves.

Referring to FIGS. 7-10, the main holder body 14 can also include a bridge portion 72 that extends across the width W of the main holder body 14 between the first and second side walls 26, 28. The bridge portion 72 includes a fiber engagement structure 74 that has a fiber engagement surface 76 (e.g., bottom side) that faces downwardly in a second direction that opposes the first direction in which the open sides the plurality of fiber positioning grooves 70 face. The fiber engagement structure 74 of the bridge portion 72 can be aligned with an open region 78 that interrupts the plurality of fiber positioning grooves 70 and the fiber engagement structure 74 extends through the height H of the main holder body 14 from the top side 22 to the fiber engagement surface 76. The optical fibers 12 routed within the plurality of fiber positioning grooves 70 can extend through the open region 78 such that top sides 80 of the optic fibers 12 are engaged by the fiber engagement surface 76 to retain the optical fibers 12 in the plurality of fiber positioning grooves 70. In certain examples, the plurality of fiber positioning grooves 70 can be separated by stand-off portions 19 (e.g., flats)(see FIG. 8). The cover 16 can engage the stand-off portions 19 when the cover 16 is installed in the main channel 66. In certain examples, a front end of the cover 16 can have an angled surface or ramp 11.

Turning again to FIGS. 5-6, the main channel 66 of the main holder body 14 can include a fiber anchoring region 82 adjacent the second end 20 of the main holder body 14. The fiber anchoring region 82 can be provided for securing the optical fibers 12 to the main holder body 14 with adhesive (e.g., epoxy). The fiber anchoring region 82 can include a non-grooved section 84 for receiving the coated portions 13 of the optical fibers 12 and a grooved portion 86 that extends from the non-grooved portion 84 to a cross-channel 88 that functions as an epoxy stop. The plurality of fiber positioning grooves 70 can extend from the cross-channel 88 to the first end 18 of the main holder body 14.

Figure 10:
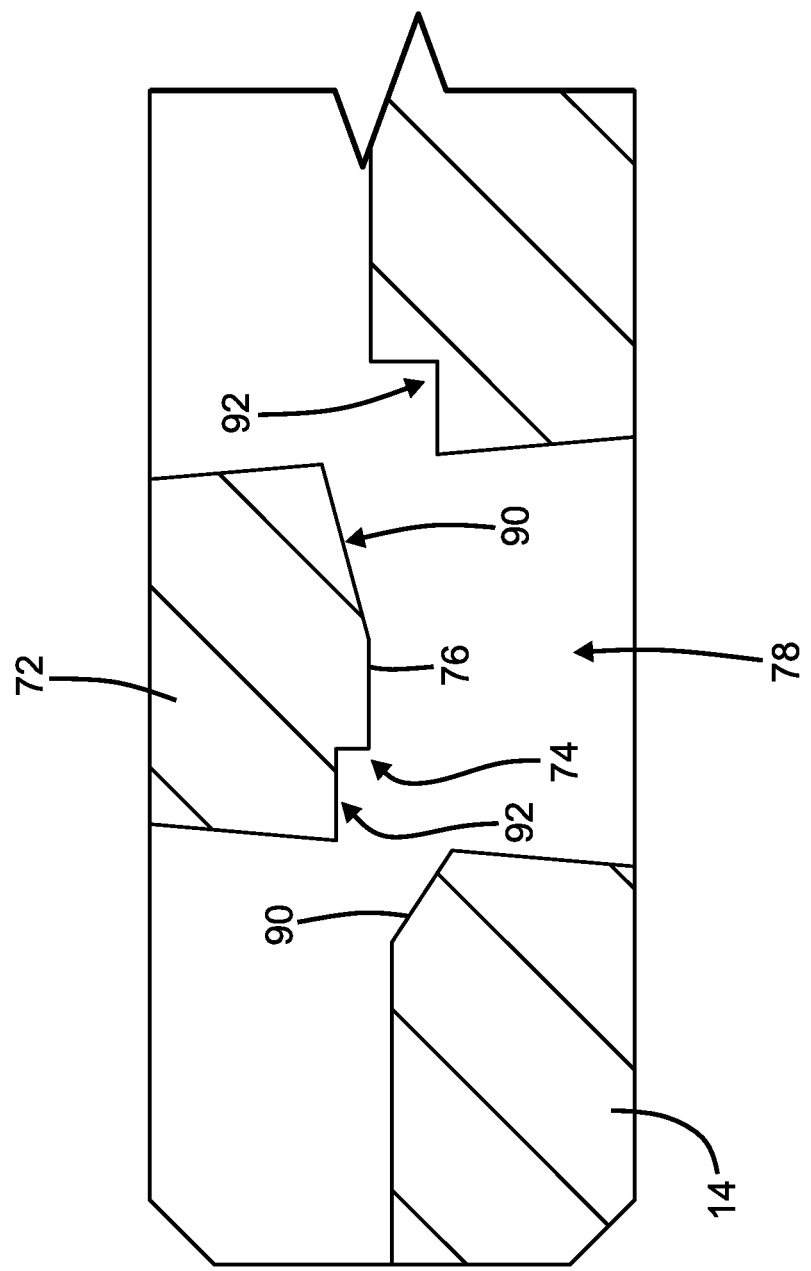
FIG. 10 illustrates the bridge portion and bed of the main holder body with angled or notched edges.

The main holder body 14 can be a single unitary piece made by a molding process in which the bridge portion 72 is made using an undercut molding processing. As shown in FIG. 10, the bridge portion 72 and the bed 68 can have an angled edge 90 or a notched edge 92 to ensure that flash areas resulting from the molding process are offset from fiber paths defined by the plurality of fiber positioning grooves 70. Such a configuration allows the optical fibers 12 to pass through the open region 78 without obstruction. FIG. 7 shows a bottom view of the open region 78 resulting from the undercut molding of the bridge portion 72. Slots 17 (see FIG. 7) can be formed in the main holder body 14 resulting from undercut molding of catches 116 (e.g., ledge).

Figure 11:
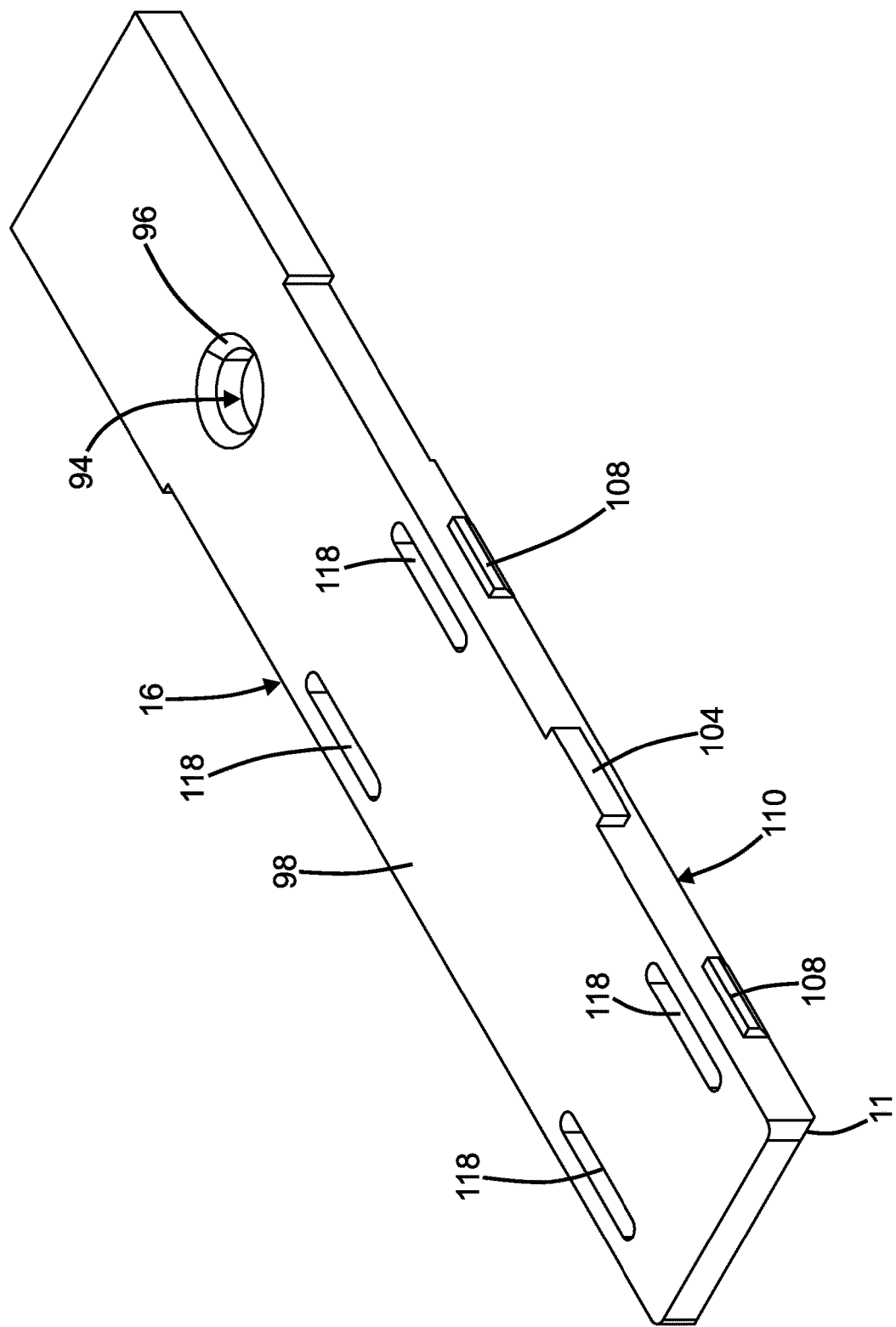
FIG. 11 illustrates a top perspective view of the cover of FIG. 1.
Figure 12:
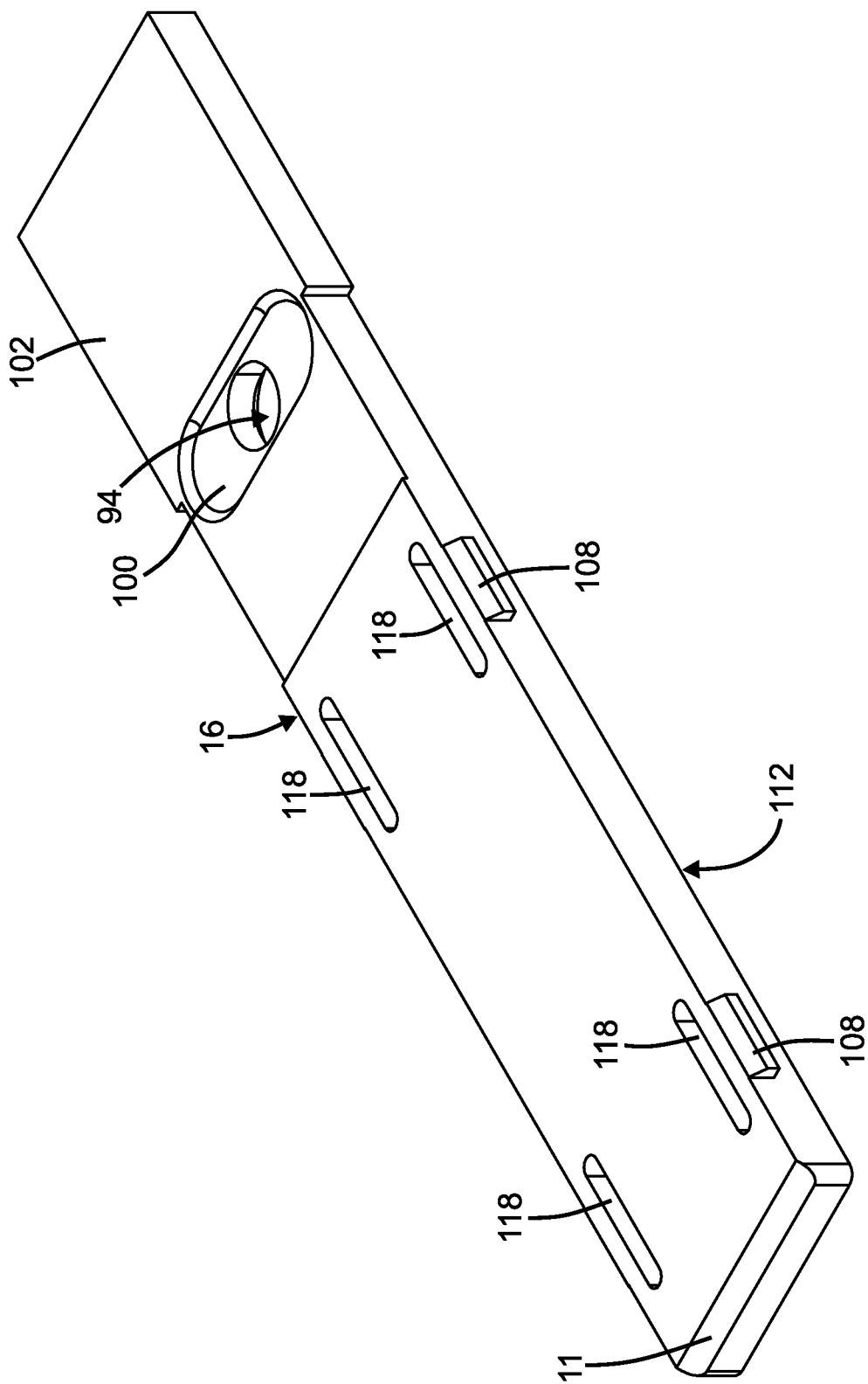
FIG. 12 illustrates a bottom perspective view of the cover of FIG. 1.

Turning to FIGS. 11-12, the cover 16 is arranged and configured to mount within the main channel 66 between the first and second side walls 26, 28 to oppose the open sides 15 of the plurality of fiber positioning grooves 70. That is, the cover 16 is configured to close the main channel 66 at the top side 22 of the main holder body 14.

The cover 16 can include a port 94 for injecting epoxy into the fiber anchoring region 82 once the cover 16 has been mounted to the main holder body 14. The port 94 is tapered and includes a chamfered surface 96 at a top 98 of the cover 16. The chamfered surface 96 can be formed by chamfering an edge portion from an inner surface of the port 94 to an outer surface of the port 94. An extended recess 100 can be provided at a bottom 102 of the cover 16 adjacent the port 94. The extended recess 100 can extend across the cover 16 to surround the port 94 and encourage the flow of epoxy throughout the fiber anchoring region 82.

In certain examples, the cover 16 includes a key 104 that mates with a keyway 106 of the main holder body 14 such that the cover 16 is installed in the proper orientation. The cover 16 can also include snap fit latches 108 that are provided at opposing sides 110, 112 of the cover 16.

The cover 16 can be retained in the main channel 66 by a snap-fit connection or a press-fit connection. For example, when the cover 16 is installed in the main channel 66, the snap fit latches 108 can engage the catches 116 defined in the main holder body 14. The snap fit latches 108 can have ramped surfaces that move past interior surfaces 114 of the first and second side walls 26, 28 of the main holder body 14 to form a snap-fit connection with the catches 116. The catches 116 can be provided in recesses 178 defined in the first and second side walls 26, 28 of the main holder body 14.

The cover 16 may also define slots 118 that are positioned adjacent to the snap-fit latches 108 at the opposing sides 110, 112. The slots 118 can be arranged and configured to provide a region that flexes as the snap-fit latches 108 are snap-fitted into place in engagement with the catches 116 within the main holder body 14.

Figure 13:
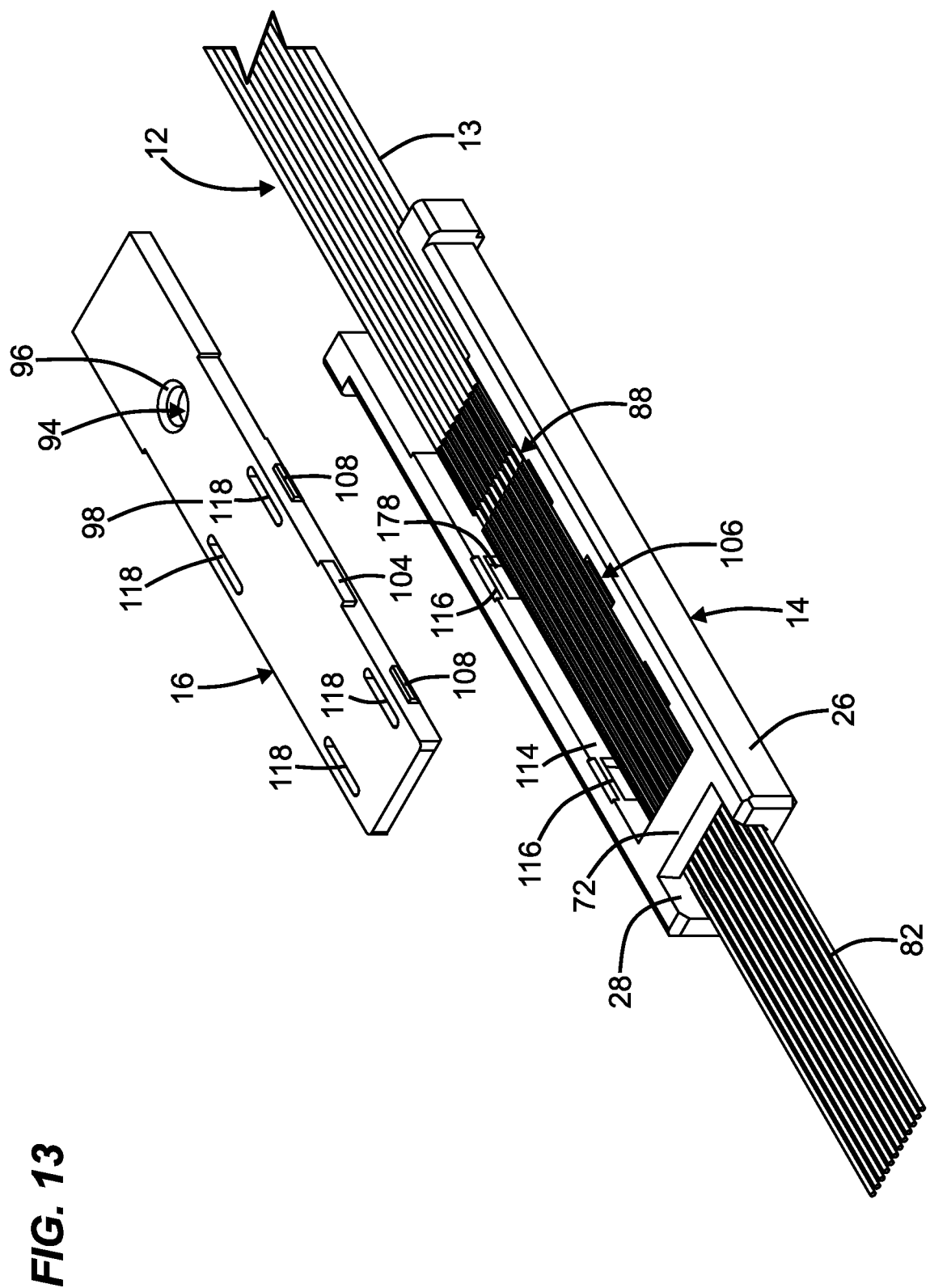
FIG. 13 illustrates the fiber holder of FIG. 1 with the cover exploded from the main holder body to show the optical fibers in place.

Referring to FIG. 13, the optical fibers 12 are shown in place within the main holder body 14 of the fiber holder 10. The optical fibers 12 may be spaced apart to define a gap between each optical fiber 12 making a pitch (i.e., center to center spacing). Example pitches include 250 micrometers and 200 micrometers. The fiber holder 10 can establish a distance from a point on one optical fiber to a corresponding point on an adjacent optical fiber as measured across a horizontal axis between adjacent optical fibers in the fiber holder 10. The fiber holder 10 can locate the individual optical fibers 12 in an x-dimension (e.g., along the W of the main holder body 14), in a y-dimension (e.g., along the height H of the main holder body 14) and can control an exit angle of the bare fiber portions 32 projecting from the fiber holder 10 in a z-dimension (e.g., along the lengths of the optical fibers 12 and a length L of the fiber holder 10).

Figure 16:
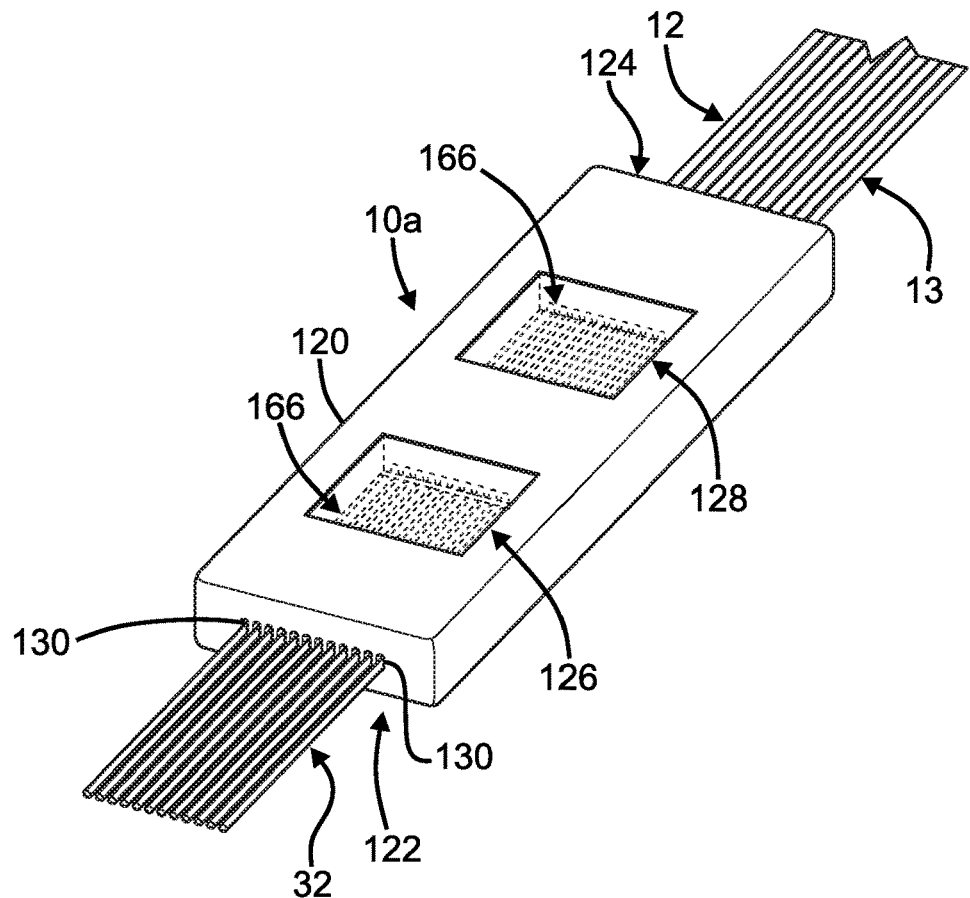

Turning to FIGS. 14-16, another example embodiment of a fiber holder 10a is depicted. The fiber holder 10a can be used with a connector similar to what was described above with reference to FIGS. 2-4. The fiber holder 10a includes a one-piece body 120 that may be formed by a undercut molding process. The fiber holder 10a includes a first end 122 and an opposite, second end 124. A plurality of fiber positioning grooves 70a through which the optical fibers 12 extend can be formed in the body 120. The optical fibers 12 can extend entirely through the fiber holder 10a. The plurality of fiber positioning grooves 70a can extend along a longitudinal axis 42a of the body 120. The plurality of fiber positioning grooves 70a can have a generally U-shaped configuration, although alternatives are possible. The plurality of fiber positioning grooves 70a can define an insertion axis $X_1$ for the optical fibers 12 that is parallel to the longitudinal axis 42a.

The fiber holder 10a includes a first window 126 and a second window 128 that are adapted to receive adhesive. For example, epoxy can be injected into the first and second windows 126, 128 for securing the optical fibers 12 to the fiber holder 10a. The first end 122 of the body 120 defines fiber openings 130 from which the bare fiber portions 32 extend.

The fiber holder 10a defines an open region 132 between the first and second windows 126, 128 that provides an intermediate section 134. The intermediate section 134 includes a plurality of grooves 136 formed therein. The plurality of grooves 136 of the intermediate section 134 can face downwardly to oppose open sides 138 of the plurality of fiber positioning grooves 70a. The open region 132 interrupts the plurality of fiber positioning grooves 70a defined in the first and second windows 126, 128. The optical fibers 12 routed within the plurality of fiber positioning grooves 70a can extend through the open region 132 to engage the plurality of grooves 136. Each of the plurality of grooves 136 can include a lead-in surface 21 for guiding the optical fibers 12 into the grooves 136. The plurality of fiber positioning grooves 70a can be separated by the stand-off portions 19. The plurality of fiber positioning grooves 70a can provide the center-to-center spacing between the optical fibers 12 to achieve a desired pitch diameter, for example, 250 micrometers or 200 micrometers, although alternatives are possible. The windows 126, 128 are defined through a first side of the holder body 120, while the intermediate section 124 corresponds to a third window defined through an opposite second side of the holder body 120 at a location between the windows 126, 128.

The second end 124 of the fiber holder 10a defines an elongated opening 140 for receiving ribbonized optical fibers 12. That is, the coated portions 13 of the optical fibers 12 can be routed into the fiber holder 10a from the second end 124 through the elongated opening 140.

Figure 17:
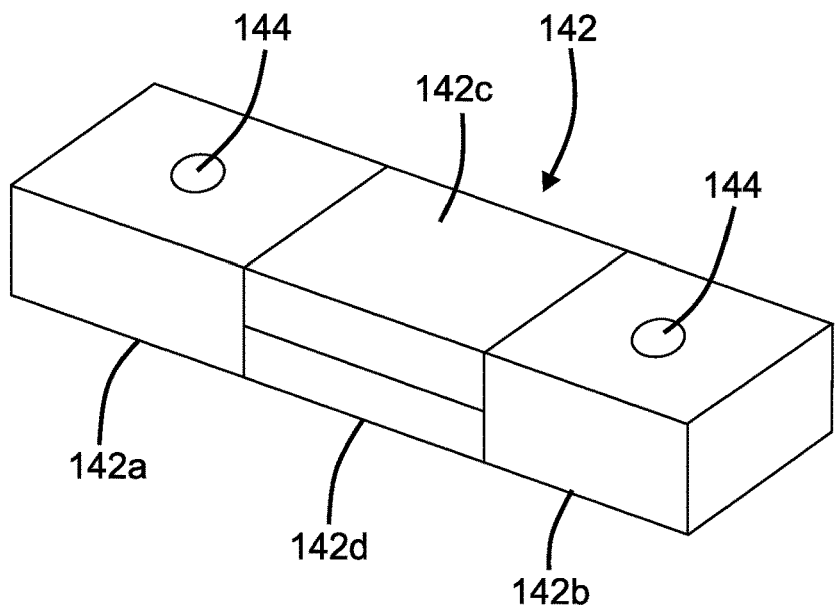
FIGS. 17-18 illustrate an example mold to make the fiber holder of FIG. 14.
Figure 18:
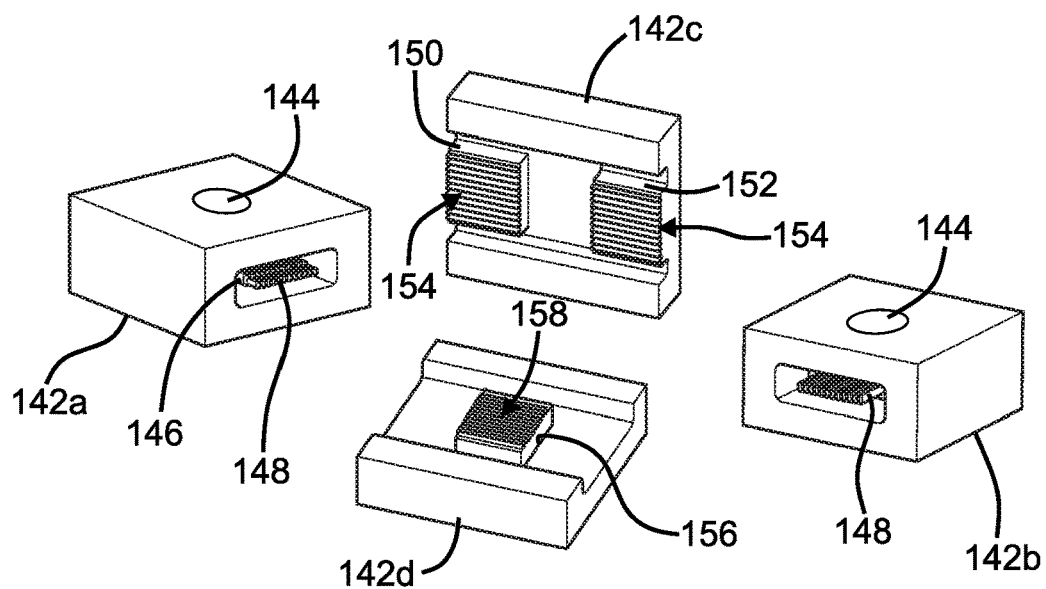

The fiber holder 10a including the first and second windows 126, 128 and the intermediate section 134 can be formed by an undercut molding process. FIGS. 17-18 show an example mold 142 for forming the fiber holder 10a. In certain examples, the mold 142 includes at least one adhesive injection port 144. In certain examples, the mold 142 includes more than one adhesive injection port 144. Epoxy can be injected into the adhesive injection port 14 to fill in all voids and spaces within the mold 142 to make the fiber holder 10a.

The mold 142 can include a first molding part 142a, a second molding part 142b, a third molding part 142c, and a fourth molding part 142d, although alternatives are possible. The first molding part 142a can define the at least one adhesive injection port 144, although alternatives are possible. The first molding part 142a includes an elongated section 146 for forming the elongated opening 140 needed for the ribbonized optical fibers 12. The first molding part 142a also includes individual core pins 148 that form short holes for the optical fibers 12 extending out the second end 124 of the body 120.

The second molding part 142b also includes the individual core pins 148 to make the fiber openings 130 at the first end 122 of the fiber holder 10a. The individual core pins 148 are short and do not extend all the way through the mold 142.

The third molding part 142c includes first and second molding blocks 150, 152 that form the first and second windows 126, 128, respectively. The first and second molding blocks 150, 152 each include a plurality of grooves 154 that correspond with the plurality of fiber positioning grooves 70a of the body 120.

The fourth molding part 142d includes a third molding block 156 that makes the undercut mold. That is, the third molding block 156 of the fourth molding part 142d creates the open region 132 of the fiber holder 10a. The third molding block 156 includes grooves 158 that correspond with the grooves 136 of the intermediate section 134.

Figure 19:
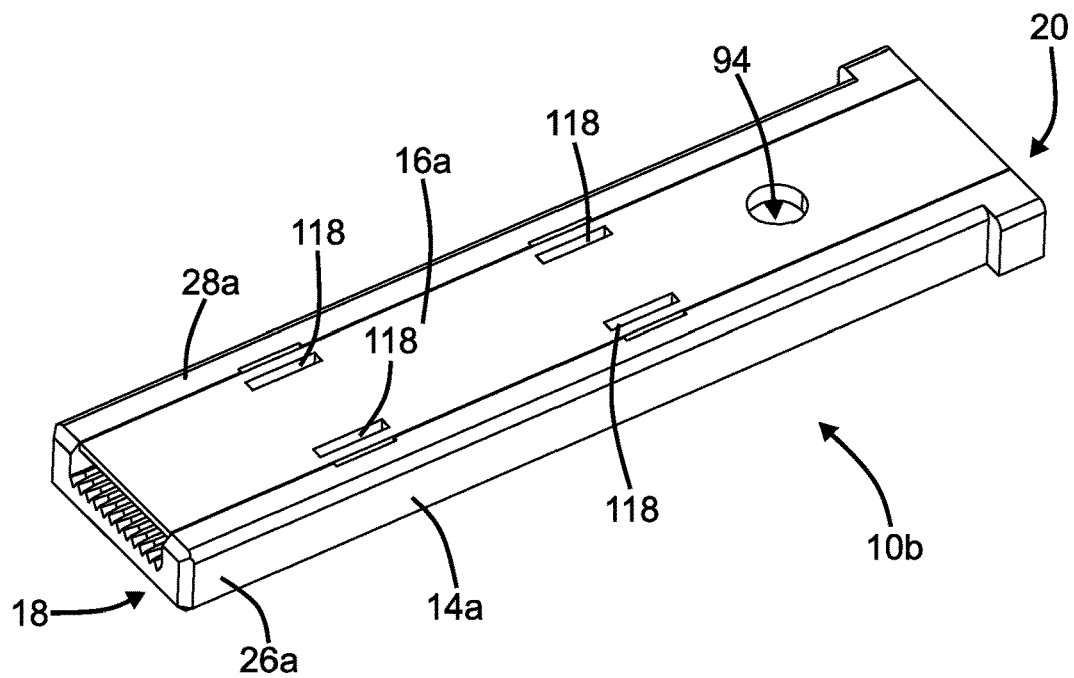
FIG. 19 illustrates a third embodiment of a fiber holder that includes a cover and main holder body without a bridge portion in accordance with the principles of the present disclosure.
Figure 20:
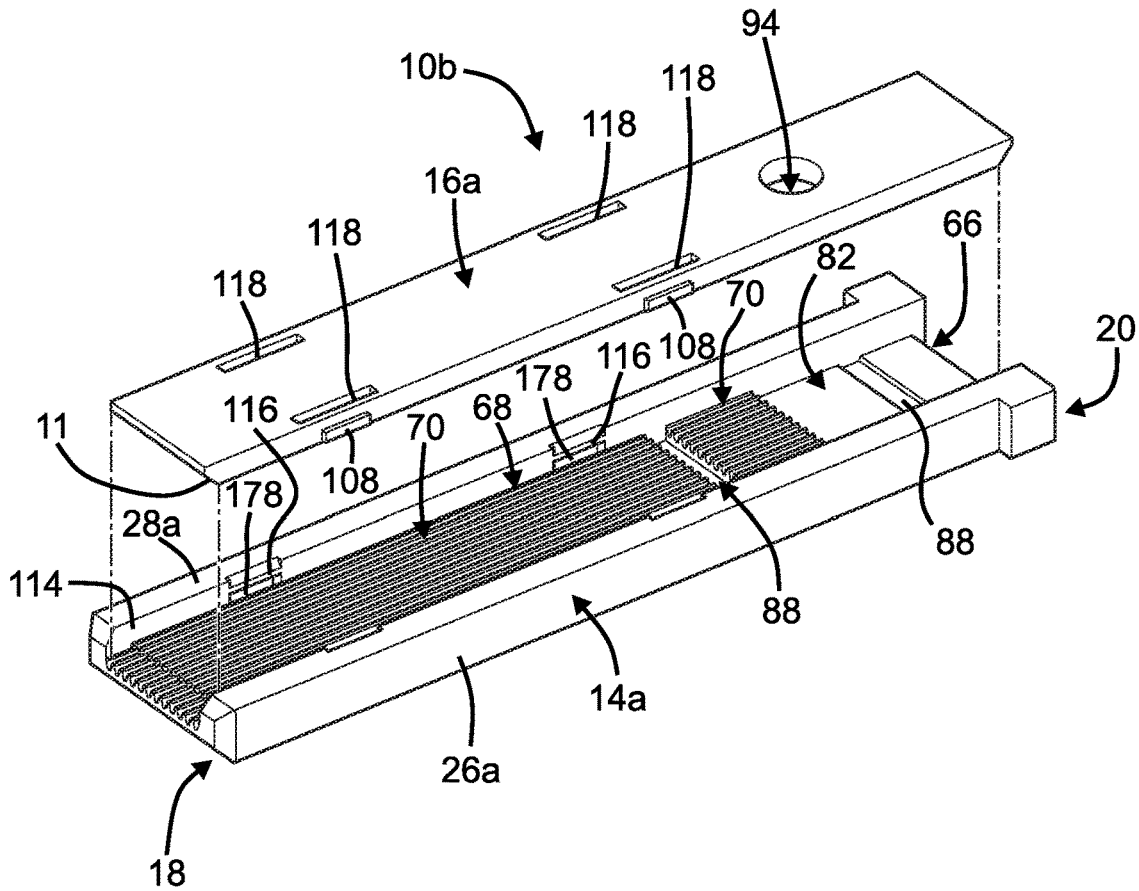
FIG. 20 illustrates the fiber holder of FIG. 19 with the cover exploded from the main holder body.

Turning to FIGS. 19-20, another example fiber holder 10b is depicted in accordance with the principles of the present disclosure. The fiber holder 10b has similar features as the fiber holder 10 previously described except there is no bridge portion 72 or key 104 that mates with keyway 106. The cover 16a of the fiber holder 10b can snap into the main channel 66 and extend along the full length or entire length L of the main holder body 14a.

Figure 21:
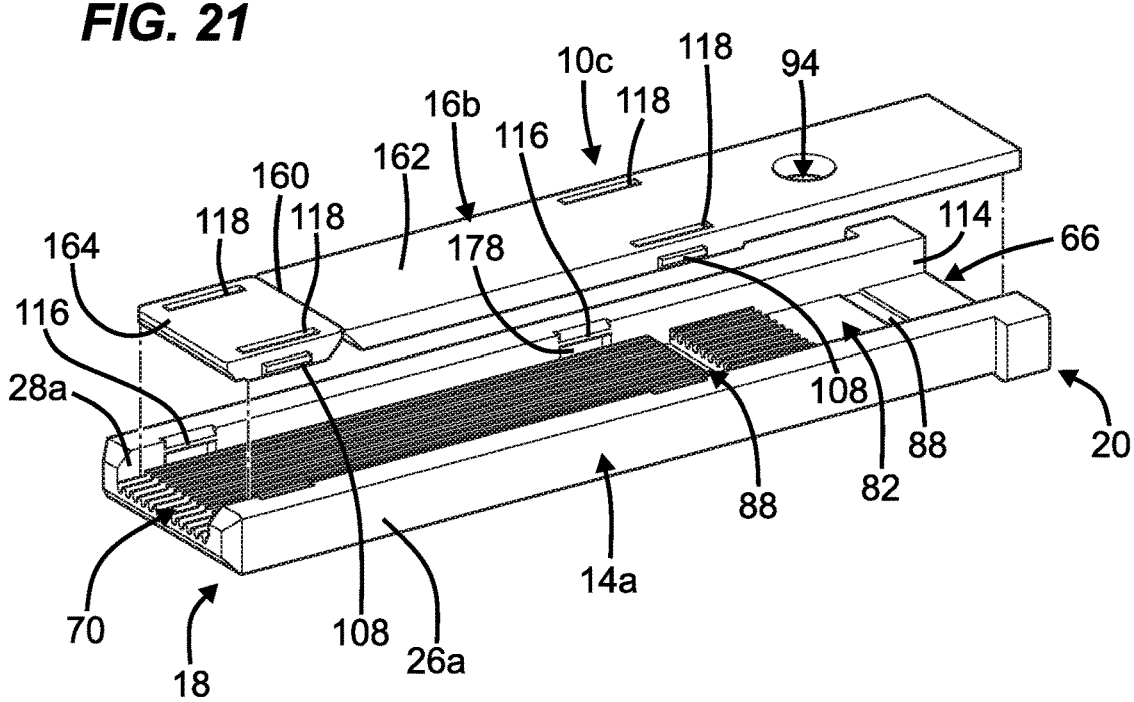
FIGS. 21-22 illustrate a fourth embodiment of a fiber holder that includes a main holder body and a cover that has two sections in accordance with the principles of the present disclosure.
Figure 22:
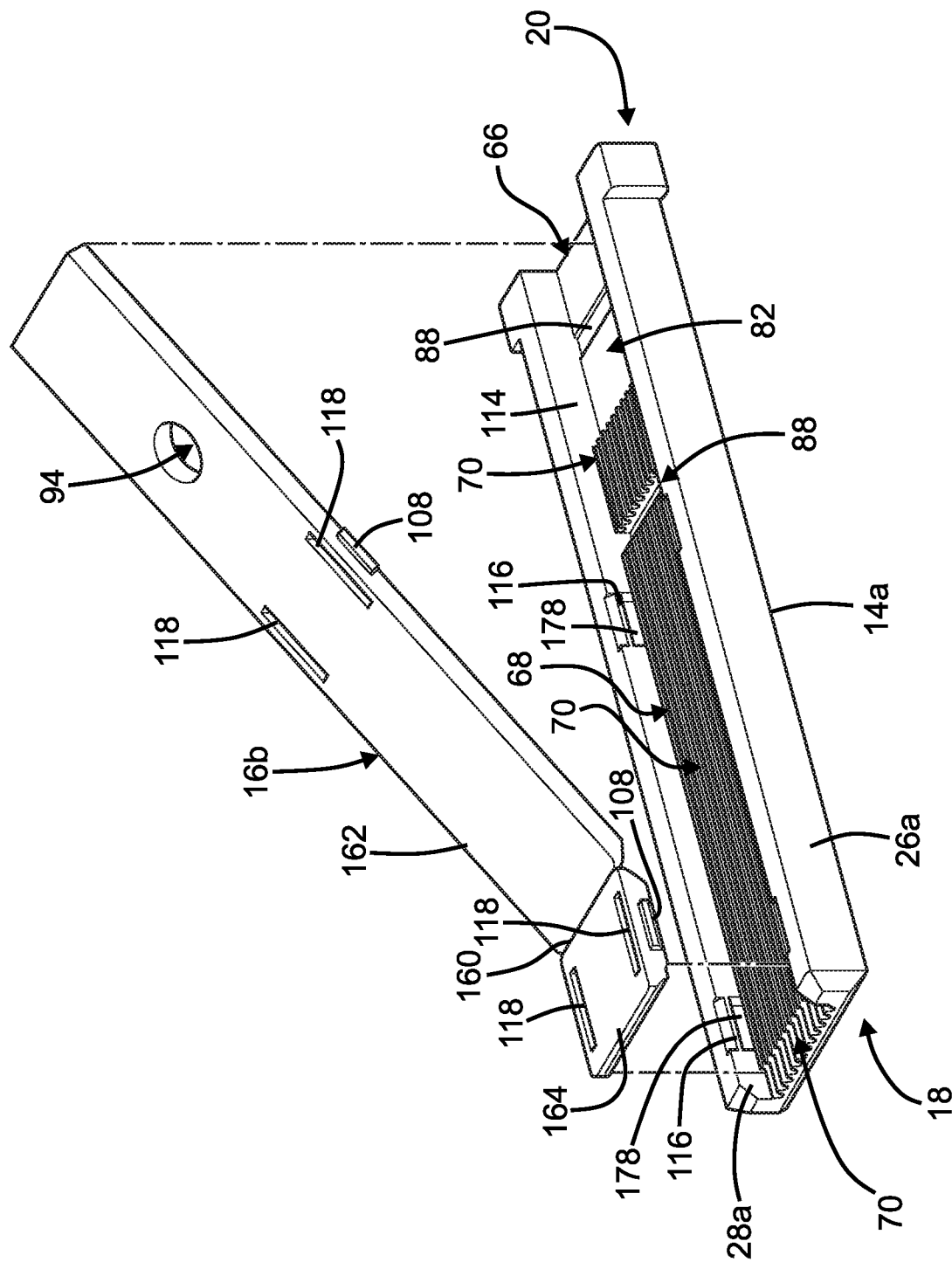
Figure 23:
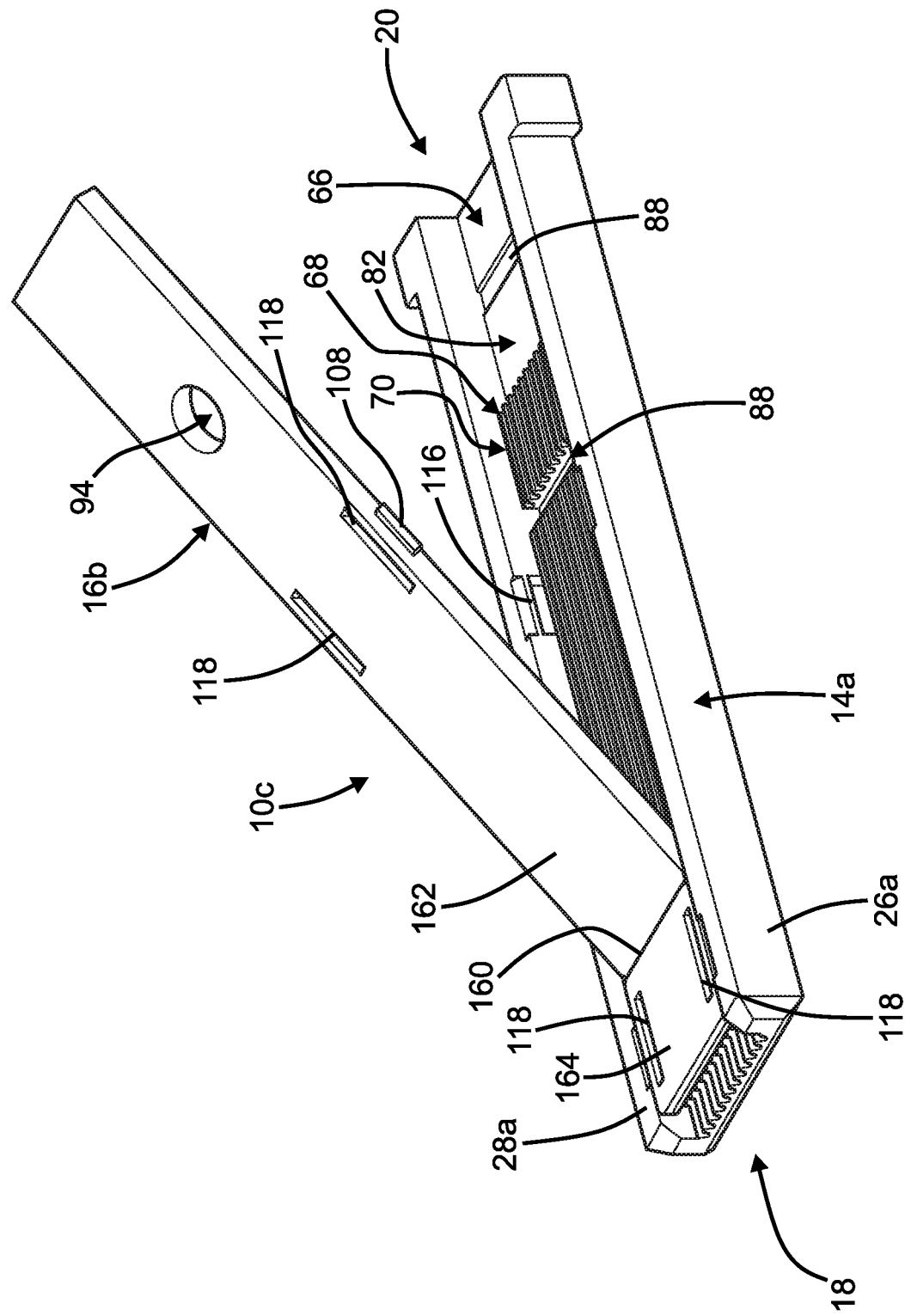
FIGS. 23-26 illustrate a sequence of mounting the cover of FIG. 21 to the main holder body and insertion of the optical fibers.

FIGS. 21-23 show another example fiber holder 10c in accordance with the principles of the present disclosure. The fiber holder 10c has similar features as the fiber holders 10, 10b except the cover 16b has a living hinge 160 that connects first and second sections 162, 164 of the cover 16b together. The first section 162 is larger than the second section 164, although alternatives are possible. When the cover 16b is installed in the main channel 66 of the main holder body 14a, the living hinge 160 allows the first section 162 of the cover 16b to be installed relative to the main holder body 14a after installation of the second section 164. Once the cover 16b is installed, the cover 16b can be glued down so that it is not to be re-opened.

Figure 24:
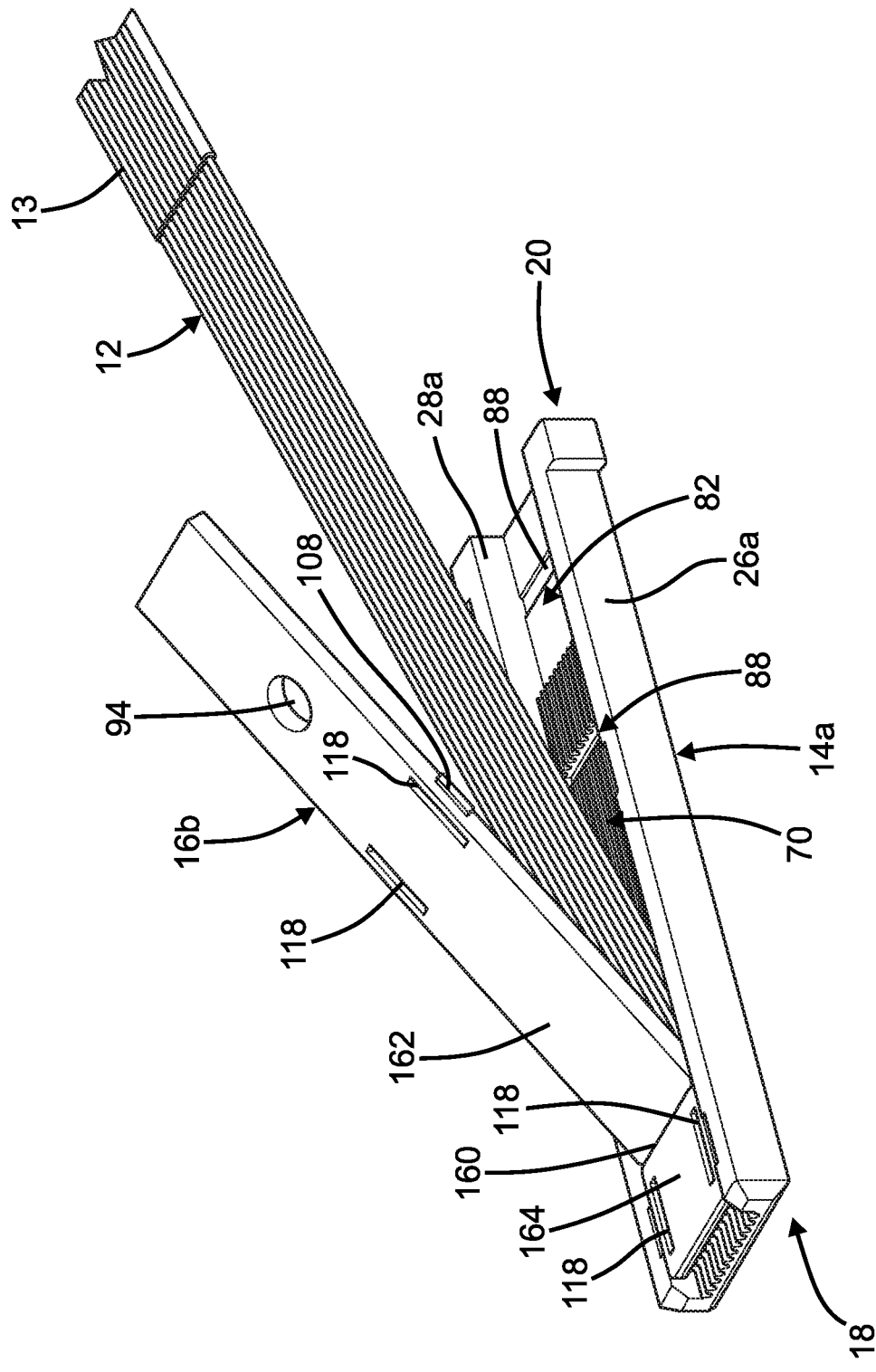
Figure 25:
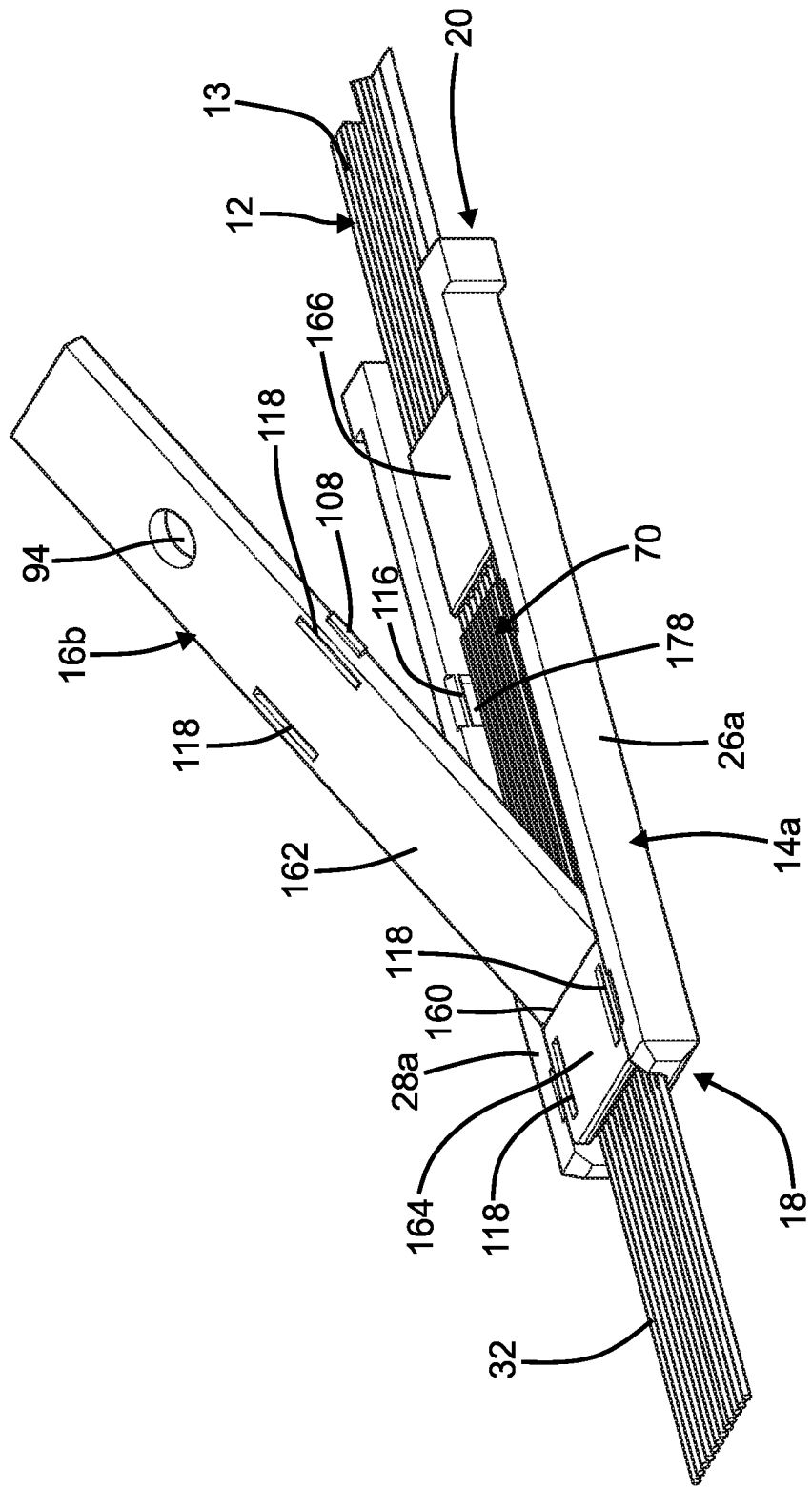
Figure 26:
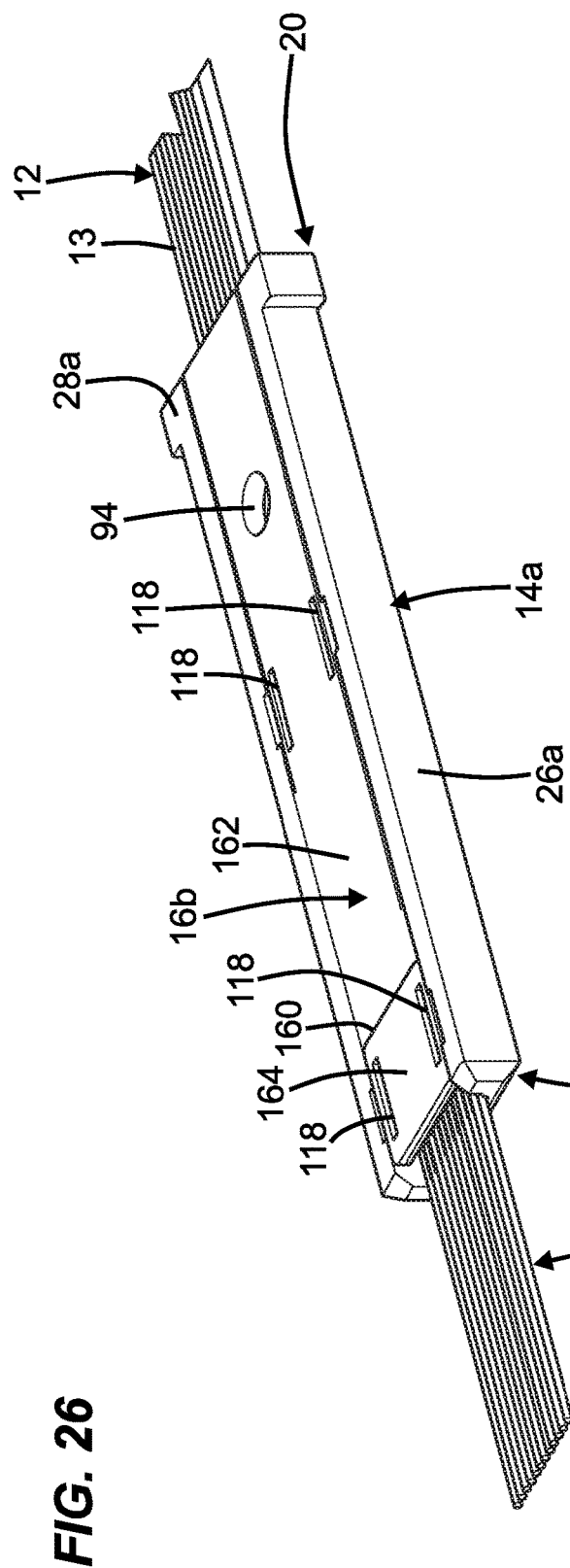

FIGS. 24-26 show a sequence of installing the cover 16b in the main channel 66 of the main holder body 14a. The first section 162 of the cover 16b defines slots 118 adjacent to snap-fit latches 108 and the second section 164 also defines slots 118 that are positioned adjacent to snap-fit latches 108. To mount the cover 16b into the main channel 66 of the fiber holder 10c, the second section 164 can be first installed by pivoting (e.g., bending, folding) the first section 162 about the living hinge 160 such that the snap-fit latches 108 of the second section 164 snap-fit into place in engagement with the catches 116 within the main holder body 14a. The second section 164 can be configured to function as a bridge over the bare fiber portions 32 mounted in the plurality of fiber positioning grooves 70.

In certain examples, the second section 164 of the cover 16b may include grooves that face the plurality of fiber positioning grooves 70 of the main holder body 14a.

The optical fibers 12 can be routed into the main channel 66 from the second end 20 of the main holder body 14a such that the bare fiber portions 32 project from the opposite, first end 18 of the fiber holder 10c. The optical fibers 12 can be anchored by adhesive 166 in the fiber anchoring region 82 of the main holder body 14a. The first section 162 of the cover 16b can be snap-fit into place in the main channel 66 such that the snap-fit latches 108 of the first section 162 engage the catches 116 of the main holder body 14a to close the cover 16b. When installed, the cover 16b helps to keep the optical fibers 12 within the plurality of fiber positioning grooves 70 of the main holder body 14a. It will be appreciated that the adhesive 166 may be applied to the optical fibers 12 before or after the first section 162 of the cover 16b is snap-fit into the main channel 66 of the main holder body 14a.

Figure 27:
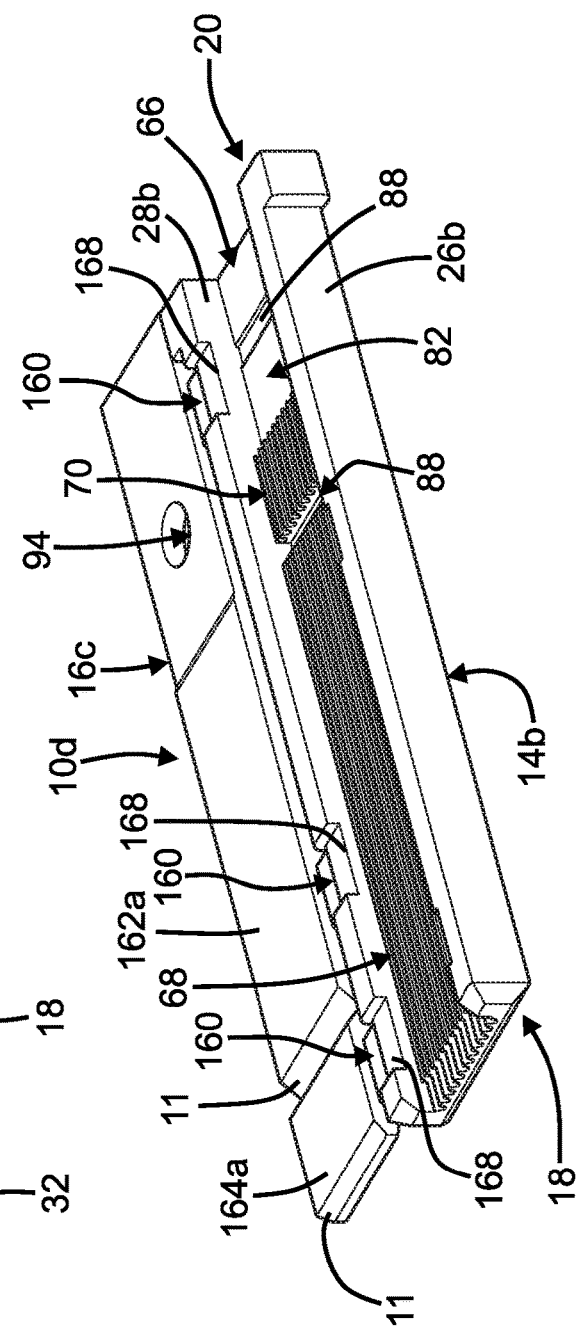

Referring to FIGS. 27-28, another example fiber holder 10d is depicted in accordance with the principles of the present disclosure. The fiber holder 10d has similar features as the fiber holders 10, 10b, 10c except the cover 16c includes living hinges 160 that pivotally connect first and second sections 162a, 164a of the cover 16c to the main holder body 14b. The first section 162a of the cover 16c has two living hinges 160 and the second section 164a has one living hinge 160, although alternatives are possible.

In certain examples, the living hinges 160 can be positioned at the second side wall 28b of the main holder body 14b. It will be appreciated that the living hinges 160 may also be positioned at the first side all 26b of the main holder body 14b. The living hinges 160 are configured to allow the first and second sections 162a, 164a of the cover 16c to be sequentially installed within the main channel 66 of the main holder body 14b.

The hinges 160 can be positioned in recesses 168 defined in the second side wall 28b of the main holder body 14b. The front ends of the first and second sections 162a, 164a of the cover 16c may include the angled surface or ramp 11. The first and second sections 162a, 164a can each include one snap-fit latch 108 that engages catch 116 to close the cover 16c on the main holder body 14b, although alternatives are possible.

When the cover 16c is installed in the main channel 66 of the main holder body 14b, the second section 164a of the cover 16c is pivoted about the living hinge 160 such that the snap-fit latch 108 engages the catch 116 to close the second section 164a in the main channel 66. When the second section 164a is closed, a bridge is created over the main holder body 14b. The optical fibers 12 can be routed in the bed 68 of the main channel 66 from the second end 20 of the main holder body 14b. The optical fibers 12 can be inserted into the plurality of fiber positioning grooves 70 and under the closed second section 164a of the cover 16c such that the bare fiber portions 32 project from the first end 18 of the fiber holder 10d. The optical fibers 12 can be anchored by adhesive 166 in the fiber anchoring region 82 of the main holder body 14b. It will be appreciated that the adhesive 166 may be applied to the optical fibers 12 before or after the first section 162a of the cover 16c is snap-fit into the main channel 66 of the main holder body 14b.

Once the optical fibers 12 are routed through the fiber holder 10d, the first section 162a of the cover 16c can be snap-fit into place in the main channel 66 such that the snap-fit latch 108 of the first section 162a engage the catch 116 of the main holder body 14b to close the remaining part of the cover 16c. When installed, the cover 16c can help to keep the optical fibers 12 within the plurality of fiber positioning grooves 70 of the main holder body 14b.

Referring to FIG. 29, another one-piece fiber holder 10e is depicted in accordance with the principles of the present disclosure. The fiber holder 10e has similar features as the fiber holders 10, 10a-d described above except the fiber holder 10e includes precision rails on the main holder body 14c.

The fiber holder 10e is one-piece molded part. The fiber holder 10e has a first side 170 and an opposite, second side 172. The fiber holder 10e can be molded such that a first rail 174 is provided at the first side 170 and a second rail 176 is provided at the second side 172, although alternatives are possible.

Optical fibers 12 can be routed completely through the main holder body 14c of the fiber holder 10e such that the bare fiber ends 32 extend through fiber openings 130 at the first end 18 of the main holder body 14c. Long core pins can be used to extend entirely through the mold to form the fiber openings 130 of the fiber holder 10e.

In certain examples, the main holder body 14c includes port 94 to receive adhesive such as epoxy for securing the optical fibers 12 within the main holder body 14c. In certain examples, more than one port may be defined in the fiber holder 10e.

Figure 30:
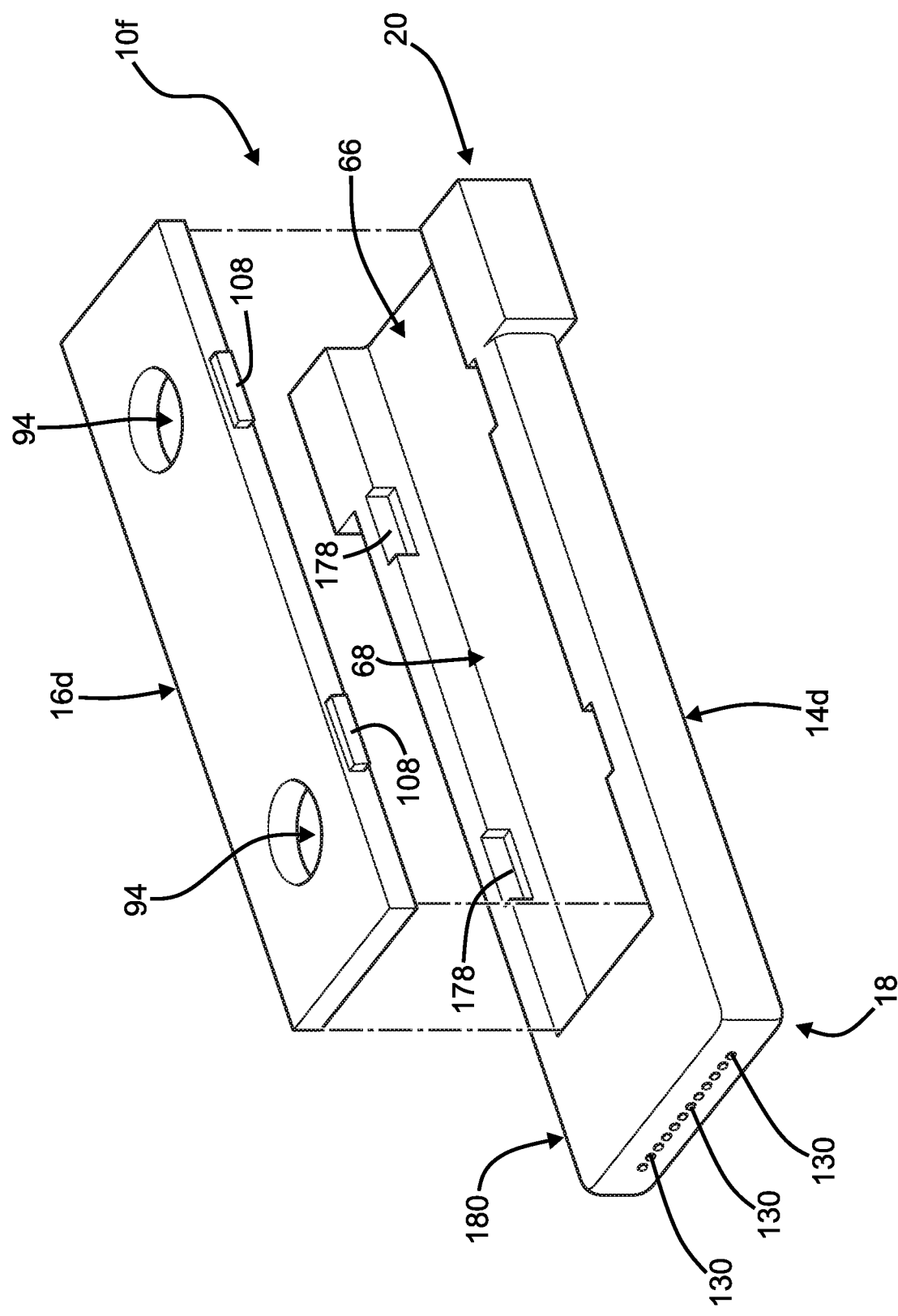
FIG. 30 illustrates a seventh embodiment of a fiber holder with a press-fit cover and main holder body in accordance with the principles of the present disclosure.

Turning to FIG. 30, another example fiber holder 10f is depicted in accordance with the principles of the present disclosure. The fiber holder 10f has similar features as the fiber holders 10, 10a-e described above except for fiber positioning grooves in the main channel 66 of main holder body 14d and snap fit-catches 116.

The main holder body 14d of the fiber holder 10f can be made by a molding process. For example, core pins can be placed in a mold to form fiber openings 130 through a solid section 180 at the first end 18 of the main holder body 14d. The fiber openings 130 within the solid section 180 provide positioning, alignment and pitch for the optical fibers 12 with the bare fiber portions 32 extending therethrough. Another mold piece with an insert can be used to form the main channel 66 of the main holder body 14d. The main channel 66 can extend from the solid section 180 to the second end 20 of the main holder body 14d.

The optical fibers 12 can be routed into the fiber holder 10f from the second end 20 of the main holder body 14d. The cover 16d includes ports 94 for injecting epoxy into the main channel 66 of the main holder body 14d to secure the optical fibers 12 to the fiber holder 10f. The cover 16d can be installed in the main channel 66 by a press-fit connection to cover the optical fibers 12. That is, latches 108 of the cover 16d can engage recesses 178 defined in the main holder body 14d which allows the cover 16d to be press-fit into the main channel 66.

Figure 31:
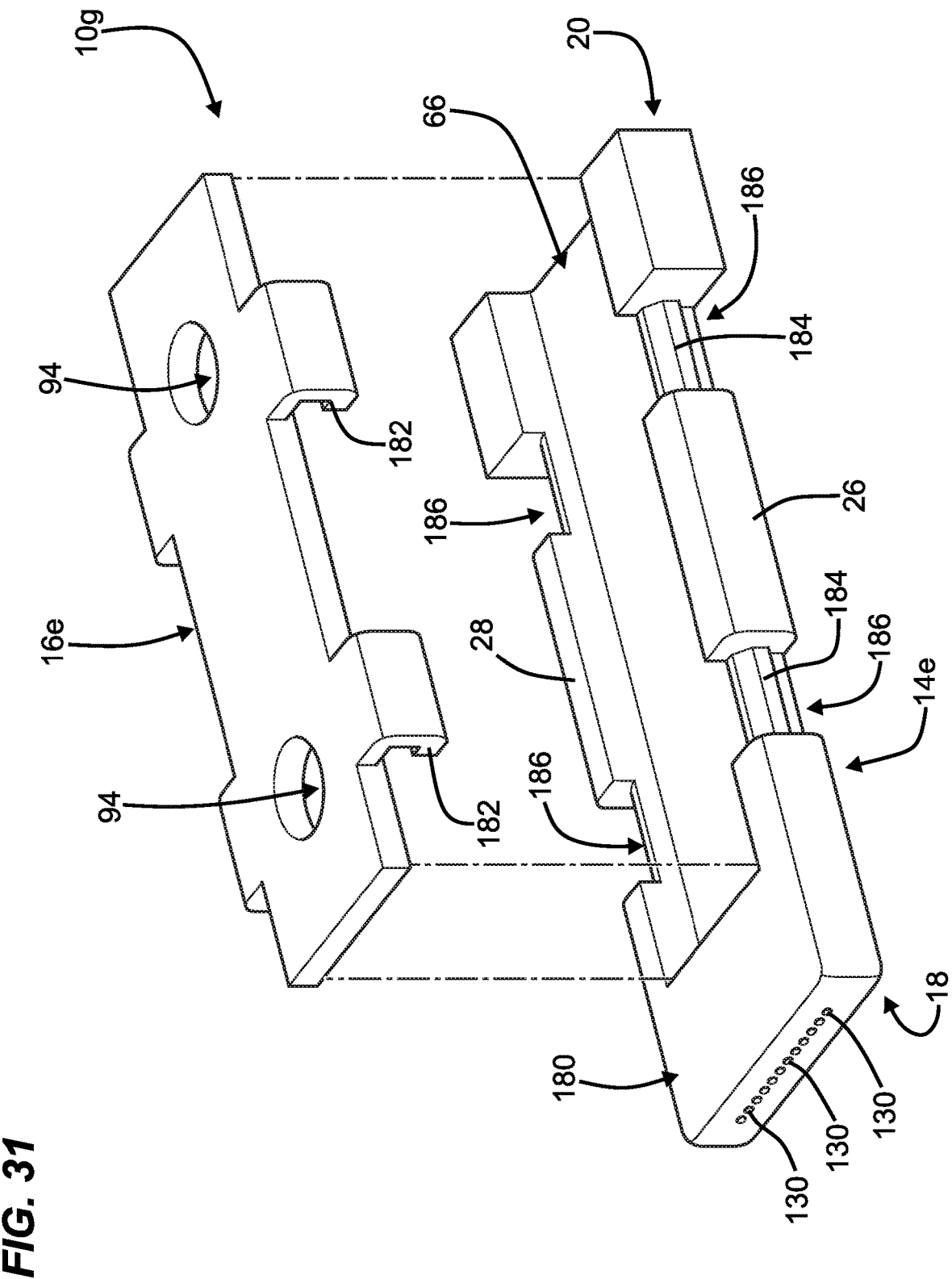
FIG. 31 illustrates an eighth embodiment of a fiber holder including a cover with latches and a main holder body in accordance with the principles of the present disclosure.

FIG. 31 shows another example fiber holder 10g in accordance with the principles of the present disclosure. The fiber holder 10g has similar features as the fiber holder 10f previously described except the fiber holder 10g includes a cover 16e with latches 182 to provide a snap-fit connection with main holder body 14e. The main holder body 14e can be made by mold with inserts to form cutout areas 186 in first and second side walls 26, 28 of the main holder body 14e. The inserts of the mold can also form catches 184 within the cutout areas 186 of the main holder body 14e. When the cover 16e is installed in the main channel 66 of the main holder body 14e, the latches 182 are configured to engage the catches 184 to make a snap-fit connection.

Figure 32:
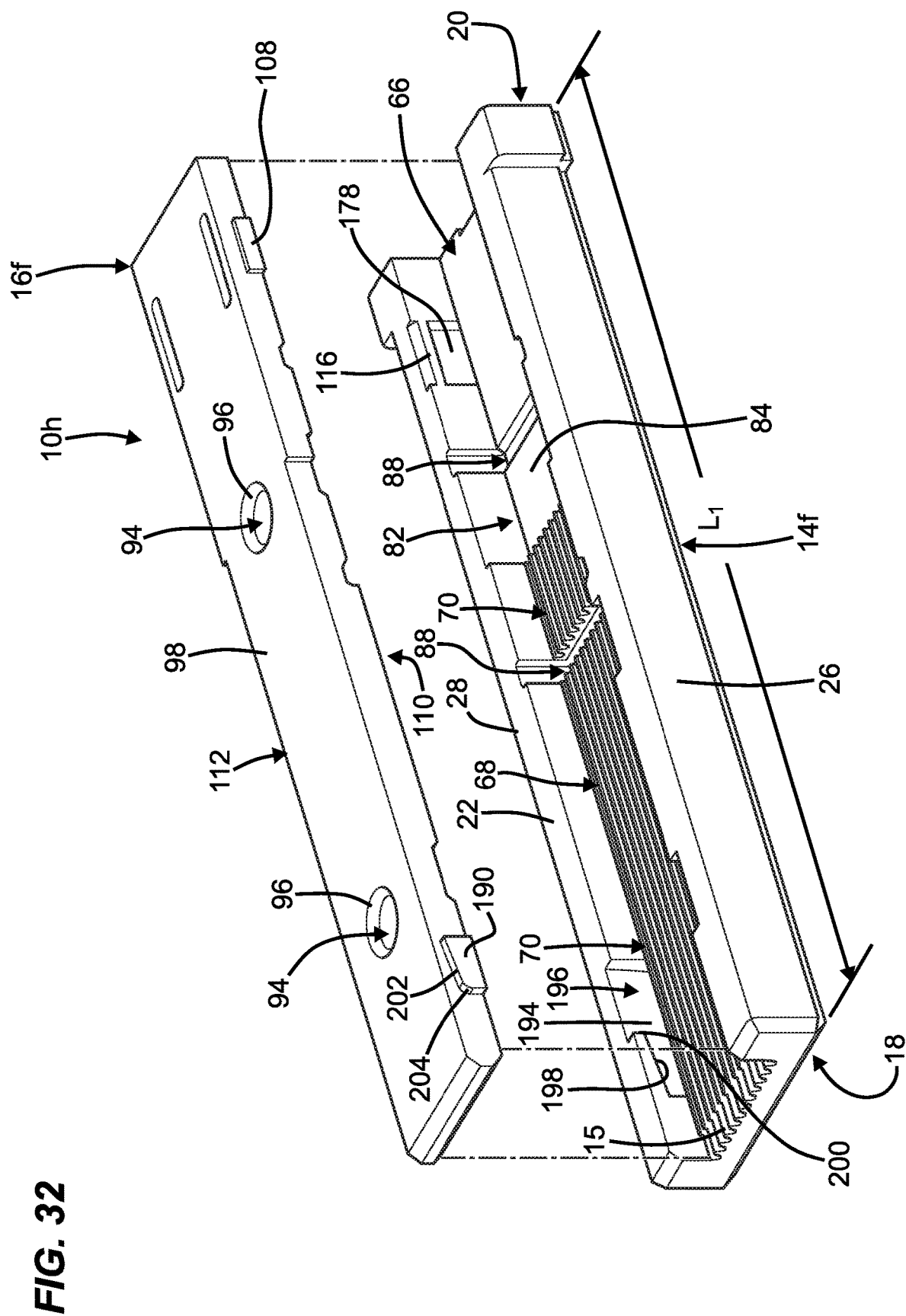
FIG. 32 illustrates a ninth embodiment of a fiber holder that includes a main holder body and a cover in accordance with the principles of the present disclosure.

Turning to FIG. 32, another example fiber holder 10h is depicted in accordance with the principles of the present disclosure. The fiber holder 10h has similar features as the fiber holder 10 previously described except there is no bridge portion 72 or key 104 that mates with keyway 106.

The main holder body 14f defines a main channel 66 that extends between the first and second ends 18, 20. The main channel 66 can be open at the top side 22 of the main holder body 14f for at least a majority of the length $L_1$ of the main holder body 14f. The main channel 66 can be defined between the first and second side walls 26, 28 and can include a bed 68 that extends between the first and second side walls 26, 28 and defines a plurality of fiber positioning grooves 70 (e.g., fiber receiving grooves) that have open sides 15 that face upwardly in a first direction. The fiber positioning grooves 70 may include V-grooves, U-shaped grooves or half rounds or other shapes of grooves.

The main channel 66 of the main holder body 14f also includes a fiber anchoring region 82 adjacent the second end 20 of the main holder body 14f. The fiber anchoring region 82 can be provided for securing the optical fibers 12 to the main holder body 14f with adhesive (e.g., epoxy). The fiber anchoring region 82 can include a non-grooved section 84 for receiving the coated portions 13 of the optical fibers 12 and a grooved portion 86 that extends from the non-grooved portion 84 to a cross-channel 88 that functions as an epoxy stop. A second epoxy stop can be provided in the non-grooved section 84 adjacent the second end 20 of the main holder body 14f. The plurality of fiber positioning grooves 70 can extend from the cross-channel 88 to the first end 18 of the main holder body 14f.

The cover 16f is arranged and configured to mount within the main channel 66 between the first and second side walls 26, 28 to oppose the open sides 15 of the plurality of fiber positioning grooves 70. That is, the cover 16f is configured to close the main channel 66 at the top side 22 of the main holder body 14f.

The cover 16f can include at least one port 94 for injecting epoxy into the fiber anchoring region 82 once the cover 16f has been mounted to the main holder body 14f. The depicted cover 16f includes two ports 94. The ports 94 are tapered and includes a chamfered surface 96 at a top 98 of the cover 16f.

The cover 16f can also include snap-fit latches 108 on opposing sides 110, 112 of the cover 16f. The snap-fit latches 108 can be positioned adjacent a rear end 188 of the cover 16f, although alternatives are possible. Catches 116 can be provided in recesses 178 defined in the first and second side walls 26, 28 of the main holder body 14f adjacent the second end 20. When the cover 16f is installed in the main channel 66, the snap-fit latches 108 can engage the catches 116 of the main holder body 14f.

The cover 16f can also include wedges 190 on opposing sides 110, 112 of the cover 16f that are located adjacent a front end 192 of the cover 16f. The snap-fit latches 108 and the wedges 190 help to retain the cover 16f in the main channel 66 as will be described below. The cover 16f can be retained in the main channel 66 by a snap-fit connection or a press-fit connection. In certain examples, the snap-fit latches 108 and the wedges 190 are made integral with the cover 16f, although alternatives are possible.

The first and second side walls 26, 28 of the main holder body 14f each define wedge receiving slots 196 and a tapered recess 194 that receive the wedges 190 of the cover 16f when the cover 16f is installed in the main channel 66. The wedge receiving slots 196 each have a tapered interior surface 198 in the first and second side walls 26, 28 of the main holder body 14f that tapers inwardly from a shoulder 200 of the first and second side walls 26, 28 in a direction towards the first end 18 of the main holder body 14f.

The wedges 190 of the cover 16f include a corresponding angled or tapered surface 202 that is configured to engage the tapered inner surfaces 198 of the main holder body 14f when the wedges 190 are inserted into the wedge receiving slots 196 and the tapered recesses 194.

FIGS. 33-35 show a sequence of installing the cover 16f in the main channel 66 of the main holder body 14f. The wedges 190 of the cover 16f can be inserted into the slots 196 of the main holder body 14f to position the front end 192 of the cover 16f in the main channel 66. The wedges 190 can include an abutment surface 204 that is configured to engage the shoulder 200 of the respective first and second side walls 26, 28 as the wedges 190 are inserted in the slots 196. Once the front end 192 of the cover 16f is installed in the main channel 66, the cover 16f can be pushed towards the first end 18 of the main holder body 14f such that the wedges 190 of the cover 16f slide past the shoulder 200 of the first and second side walls 26, 28. The tapered surface 202 of the wedges 190 engage and slide along the tapered inner surface 198 of the respective first and second side walls 26, 28 to force the cover 16f into the main channel 66 toward the open sides 15 of the plurality of fiber positioning grooves 70.

Figure 36:
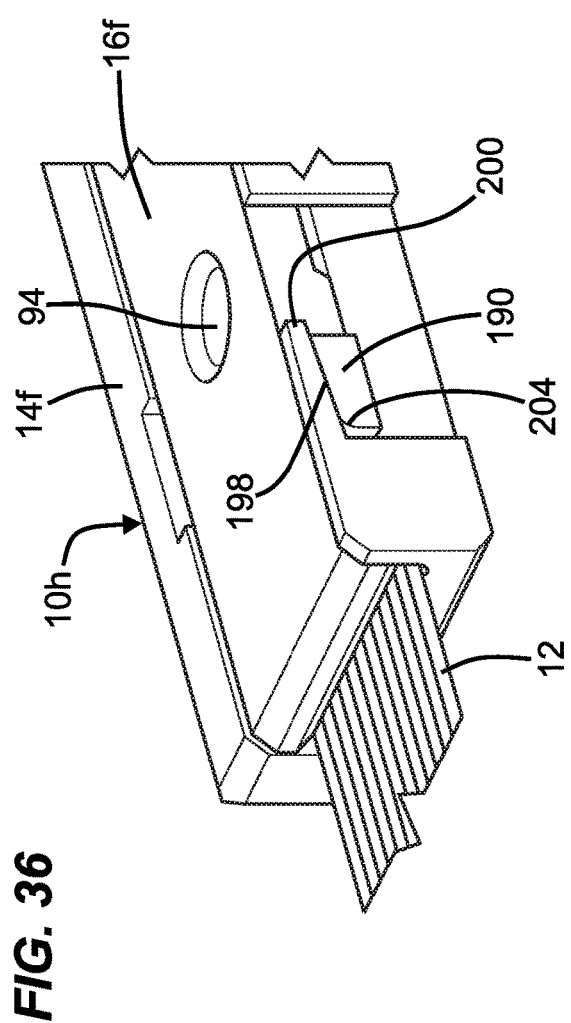
FIG. 36 is a perspective partial view of the fiber holder of FIG. 32 and the cover installed.
Figure 37:
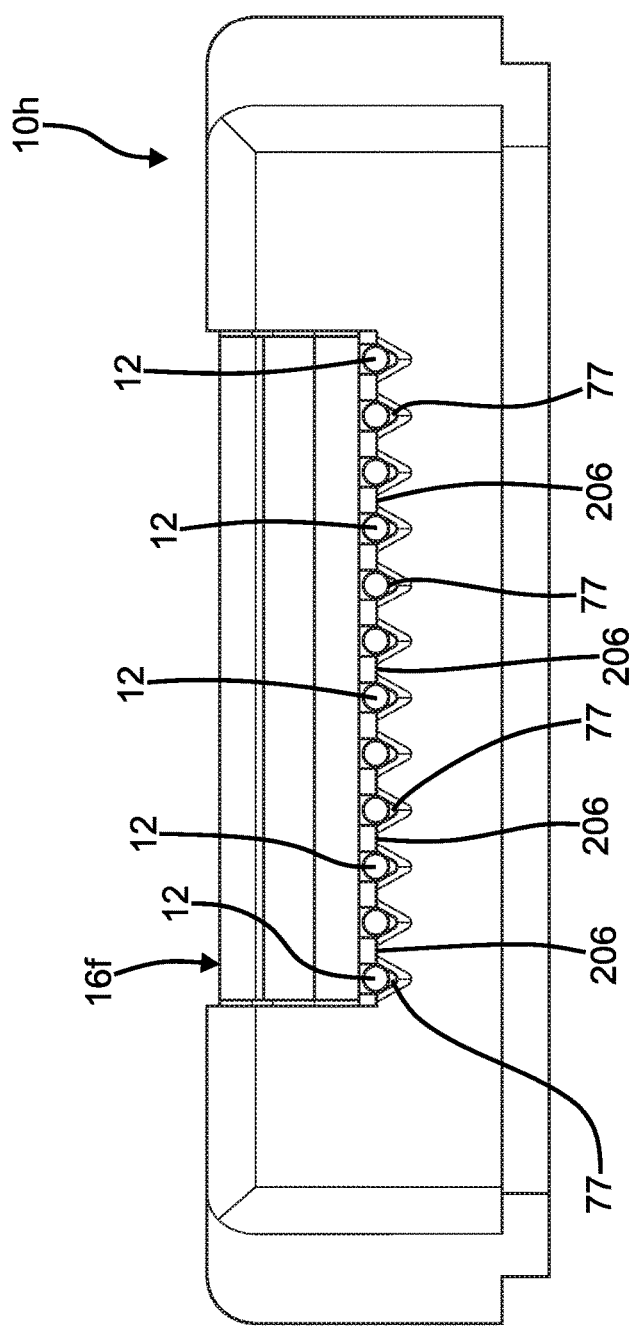
FIG. 37 is an end view of the fiber holder of FIG. 36 with optical fibers inserted.

Turning to FIGS. 36-37, when the front end 192 of the cover 16f is fully inserted down in the main channel 66 and is slid forward or moved longitudinally into the main channel, the tapered surfaces 202 of the wedges 190 can ride along the tapered inner surfaces 198 of the main holder body 14f to cause the cover 16f to ramp down against standoff-off portions (e.g., spacing posts, flats) 206 located between the plurality of fiber positioning grooves 70 to clamp the optical fibers 12 down within the plurality of fiber positioning grooves 70. That is, the tapered surfaces 202 of the wedges 190 and the tapered inner surfaces 198 of the first and second side walls 26, 28 allow the cover 16f to ramp down to be held down tight against the stand-offs portions 206 to help retain the optical fibers 12 within the plurality of fiber positioning grooves 70. When the cover 16f is fully installed in the main channel 66, the snap-fit latches 108 can engage the catches 116 to secure the rear end 188 of the cover 16f into the main channel 66.

From the forgoing detailed description, it will be evident that modifications and variations can be made without departing from the spirit and scope of the disclosure.

What is claimed is:

1. A fiber holder for holding optical fibers, the fiber holder comprising:
   a main holder body having a length that extends between first and second ends of the main holder body, a width that extends between first and second side walls of the main holder body, and a height that extends between top and bottom sides of the main holder body;
   the main holder body defining a plurality of fiber positioning grooves that extend along the length of the main holder body and are spaced across the width of the main holder body; and
   a cover that mounts within a main channel between the first and second side walls of the main holder body to close the main channel at the top side of the main holder body and to oppose open sides of the plurality of fiber positioning grooves, wherein the cover includes two sections that are connected to the main holder body by a living hinge.

2. The fiber holder of claim 1, wherein the cover is retained in the main channel of the main holder body by a snap-fit connection.

3. The fiber holder of claim 1, wherein the cover is retained in the main channel of the main holder body by a press-fit connection.

4. The fiber holder of claim 1, wherein the cover includes two sections that are connected together by a living hinge.

5. The fiber holder of claim 1, wherein the main channel extends between the first and second ends of the main holder body.

6. The fiber holder of claim 5, wherein the main channel includes a fiber anchoring region adjacent the second end of the main holder body.

7. The fiber holder of claim 6, wherein the fiber anchoring region includes a non-grooved section for receiving coated portions of a plurality of optical fibers and a grooved section that extends from the non-grooved section to a cross-channel that functions as an epoxy stop.

8. The fiber holder of claim 1, wherein the main holder body includes a bed that extends between the first and second side walls, the bed defining the plurality of fiber positioning grooves that extend along the length of the main holder body and are spaced across the width of the main holder body.

9. The fiber holder of claim 8, wherein the plurality of fiber positioning grooves are separated by stand-off portions defined in the main holder body.

10. A fiber holder for holding optical fibers, the fiber holder comprising:
a main holder body having a length that extends between first and second ends of the main holder body, a width that extends between first and second side walls of the main holder body, and a height that extends between top and bottom sides of the main holder body;
the main holder body defining a plurality of fiber positioning grooves that extend along the length of the main holder body and are spaced across the width of the main holder body;
at least one epoxy injection port for receiving epoxy to secure optical fibers routed through the fiber holder; and
a main channel that extends between the first and second ends of the main holder body and includes a fiber anchoring region adjacent the second end of the main holder body, wherein the fiber anchoring region includes a non-grooved section for receiving coated portions of a plurality of optical fibers and a grooved section that extends from the non-grooved section to a cross-channel that functions as an epoxy stop.

11. The fiber holder of claim 10, wherein the first and second side walls each include a precision rail.

12. The fiber holder of claim 10, further comprising a cover, wherein the at least one epoxy injection port is defined in the cover of the fiber holder.

13. The fiber holder of claim 12, wherein the cover is retained in the main holder body by a snap-fit connection or a press-fit connection.

14. The fiber holder of claim 12, wherein the at least one epoxy injection port has a chamfered outer surface at a top side of the cover.

15. The fiber holder of claim 12, wherein an extended recess is provided at a bottom side of the cover, the extended recess extending across a width of the cover and surrounding the at least one epoxy injection port to encourage the flow of epoxy.

16. A fiber holder for holding optical fibers, the fiber holder comprising:
a main holder body having a length that extends between first and second ends of the main holder body, a width that extends between first and second side walls of the main holder body, and a height that extends between top and bottom sides of the main holder body, wherein the first and second side walls of the main holder body each define a wedge receiving slot that has a tapered interior surface;
the main holder body defining a plurality of fiber positioning grooves that extend along the length of the main holder body and are spaced across the width of the main holder body, wherein stand-off portions are located between the plurality of fiber positioning grooves; and
a cover including wedges on opposing sides thereof, the wedges having a tapered surface, wherein, when the cover is moved longitudinally into a main channel, the tapered surface of the wedges are configured to cooperate with the tapered interior surface of the main holder body to cause the cover to ramp downward against the stand-off portions to clamp the optical fibers routed within the plurality of fiber positioning grooves.

17. A fiber holder for holding optical fibers, the fiber holder comprising:
a main holder body having a length that extends between first and second ends of the main holder body, a width that extends between first and second side walls of the main holder body, and a height that extends between top and bottom sides of the main holder body;
the main holder body defining a plurality of fiber positioning grooves that extend along the length of the main holder body and are spaced across the width of the main holder body; and
a cover that mounts within a main channel between the first and second side walls of the main holder body to close the main channel at the top side of the main holder body and to oppose open sides of the plurality of fiber positioning grooves, wherein the cover includes two sections that are connected together by a living hinge.

18. A fiber holder for holding optical fibers, the fiber holder comprising:
a main holder body having a length that extends between first and second ends of the main holder body, a width that extends between first and second side walls of the main holder body, and a height that extends between top and bottom sides of the main holder body;
the main holder body defining a plurality of fiber positioning grooves that extend along the length of the main holder body and are spaced across the width of the main holder body; and
a cover that mounts within a main channel between the first and second side walls of the main holder body to close the main channel at the top side of the main holder body and to oppose open sides of the plurality of fiber positioning grooves, wherein the main channel extends between the first and second ends of the main holder body and includes a fiber anchoring region adjacent the second end of the main holder body, wherein the fiber anchoring region includes a non-grooved section for receiving coated portions of a plurality of optical fibers and a grooved section that extends from the non-grooved section to a cross-channel that functions as an epoxy stop.

\* \* \* \* \*